(12) United States Patent
Barker et al.

(10) Patent No.: US 7,001,690 B2
(45) Date of Patent: Feb. 21, 2006

(54) LITHIUM-BASED ACTIVE MATERIALS AND PREPARATION THEREOF

(75) Inventors: Jeremy Barker, Redmond, WA (US); M. Yazid Saidi, Redmond, WA (US)

(73) Assignee: Valence Technology, Inc., Henderson, NV (US)

( * ) Notice: Subject to any disclaimer, the term of this patent is extended or adjusted under 35 U.S.C. 154(b) by 363 days.

(21) Appl. No.: 09/484,799

(22) Filed: Jan. 18, 2000

(65) Prior Publication Data
US 2003/0129492 A1 Jul. 10, 2003

(51) Int. Cl.
*H01M 4/48* (2006.01)

(52) U.S. Cl. .................... 429/221; 429/231.1

(58) Field of Classification Search ............ 429/218.1, 429/231.1, 231.3, 221; 423/311, 312
See application file for complete search history.

(56) References Cited

U.S. PATENT DOCUMENTS

| | | |
|---|---|---|
| 4,512,905 A | 4/1985 | Clearfield et al. |
| 4,683,181 A | 7/1987 | Armand et al. |
| 4,690,877 A | 9/1987 | Gabano et al. |
| 4,707,422 A | 11/1987 | deNeufville et al. |
| 4,985,317 A | 1/1991 | Adachi et al. |
| 5,219,677 A | 6/1993 | Labat et al. |
| 5,232,794 A | 8/1993 | Krumpelt et al. |
| 5,262,548 A | 11/1993 | Barone |
| 5,296,436 A | 3/1994 | Bortinger |
| 5,496,663 A | 3/1996 | Walk et al. |
| 5,514,490 A | 5/1996 | Chen et al. |
| 5,567,548 A | 10/1996 | Walk et al. |
| 5,721,070 A | 2/1998 | Shackle |
| 5,871,866 A | 2/1999 | Barker et al. |
| 5,910,382 A | 6/1999 | Goodenough et al. |
| 6,153,333 A | 11/2000 | Barker ................ 428/218.1 |
| 6,514,640 B1 * | 2/2003 | Armand et al. .......... 429/231.1 |
| 2002/0195591 A1 | 12/2002 | Ravet et al. |

FOREIGN PATENT DOCUMENTS

| | | |
|---|---|---|
| CA | 2096386 | 11/1993 |
| CA | 2200998 | 9/1998 |
| DE | 40 24 409 A1 * | 2/1990 |
| DE | 40 24 409 A1 | 8/1990 |
| DE | 40 244 09 A1 | 2/1992 |
| EP | 571858 | 12/1993 |
| EP | 571858 B1 | 12/1993 |
| EP | 0 680 106 A1 | 11/1995 |
| EP | JP 11111295 | 4/1999 |

(Continued)

OTHER PUBLICATIONS

Ni et al., "Triphylite-lithiophilite series in China", Yanshi Kuangwuxue Zazhi (1989), 8(2), 144-55.*

(Continued)

*Primary Examiner*—Carol Chaney
(74) *Attorney, Agent, or Firm*—Michael D. Ross; Roger A. Williams; Cynthia S. Kovacev

(57) ABSTRACT

The invention provides novel lithium-mixed metal materials which, upon electrochemical interaction, release lithium ions, and are capable of reversibly cycling lithium ions. The invention provides a rechargeable lithium battery which comprises an electrode formed from the novel lithium-mixed metal materials. Methods for making the novel lithium-mixed metal materials and methods for using such lithium-mixed metal materials in electrochemical cells are also provided. The lithium-mixed metal materials comprise lithium and at least one other metal besides lithium. Preferred materials are lithium-mixed metal phosphates which contain lithium and two other metals besides lithium.

46 Claims, 22 Drawing Sheets

FOREIGN PATENT DOCUMENTS

| | | | |
|---|---|---|---|
| EP | 1 049 182 A2 | 11/2000 | |
| JP | 61-263069 | 11/1986 | |
| JP | 5299101 | 11/1993 | |
| JP | 52999101 | 11/1993 | |
| JP | 5325961 | 12/1993 | |
| JP | 08171938 | 7/1996 | |
| JP | 9134724 | 5/1997 | |
| JP | 09134725 | 5/1997 | |
| JP | 09171827 | 6/1997 | |
| JP | 11 0259 983 | * | 1/1999 |
| JP | 11025983 | 1/1999 | |
| JP | 11111295 | 4/1999 | |
| JP | 2000294238 | 10/2000 | |
| JP | WO 200060680 | 10/2000 | |
| JP | 2001052733 | 2/2001 | |
| JP | 2001085010 | 3/2001 | |
| JP | 2001110455 | 4/2001 | |
| WO | WO 9512900 | 5/1995 | |
| WO | WO 97/40541 | 10/1997 | |
| WO | PCT/US00/35302 | 5/2001 | |

OTHER PUBLICATIONS

International Search Report for PCT/US97/15544.

Rangan et al., "New Titanium-Vanadium Phosphates of Nasicon and Langbeinite Structures, and Differences Between the Two Structures Toward Deintercalation of Alkali Metal," *Journal of Solid State Chemistry*, 109, (1994) pp 116-121.

Delmas et al., "The Nasicon-Type Titatium Phosphates $ATi_2(PO_4)_3$(A=Li, Na) as Electrode.Materials," *Solid State Ionics* (1988) 28-30 pp 419-423.

Hagenmuller et al., "Intercalation in 3D-Skeleton Structures: Ionic and Electronic.Features," *Material Resources Society Symposium Proc.*, vol. 210 (1991) pp 323-334.

Chem. Abstrs. Svs., (1997), XP 2048304.

Padhi et al., Lithium Intercalation into NASICON-Type Mixed Phosphates: . . . and $Li_2FeTi(PO_4)_3$; 37$^{th}$ Power Sources Conference; Cherry Hill, New Jersey, Conference Date: Jun. 17-20, 1996, published Oct. 15, 1996.

Boutinaud et al., "The Solid Solution BaLi1-xCuxPO4 (x $\leq$ 0.5): An Example of Cu+ Single-Ion Luminescence in Oxide Insulators"; J. Mater. Chem 1996, 6(3), pp 381-384.

Patent Abstracts of Japan, 11025983, Jan. 29, 1999, Japan Storage Battery Col., Ltd.

Patent Abstracts of Japan, 05299101, Nov. 12, 1993, Sanyo Electric Co., Ltd.

Patent Abstracts of Japan, 11111295, Apr. 23, 1999, Japan Storage Battery Co., Ltd.

Goni et al., "7Li and 31P Nuclear Magnetic Resonance Studies of Li1-3xMgFexPO4"; Journal of Applied Physics, vol. 84, No. 1, Jul. 1, 1998, pp 416-421.

Nanjundaswamy et al., "Synthesis, Redox Potential Evaluation and Electrochemical Characteristics of NASICON-Related-3D Framework Compounds"; Solid State Ionics 92 (1996) pp 1-10.

Gopalakrishnan et al., "V2(PO4)3: A Novel NASICON-Type Vanadium Phosphate Synthesized by Oxidative Deintercalation of Sodium from Na3V2(PO4)3"; Chemistry of Materials, vol. 4, No. 4, Jul./Aug. 1992.

Martinez-Juarez et al., "Relationship Between Activation Energy and Bottleneck Size for Li+ Ion Conduction in NASICON Materials of Composition LiMM'(PO4)3; M, M'=Ge, Ti, Sn, Hf"; J. Phys. Chem, 1998, pp 372-375.

Cocciantelli et al., "On the $\Delta \rightarrow \gamma$ Irreversible Transformation in Li/V2O5 Secondary Batteries," Solid State Ionics 78 (1995) pp 143-150.

Delmas et al., "The LixV2O5 System: An Overview of the Structure Modifications Induced by the Lithium Intercalation"; Solid State Ionics, 69 (1994) pp 257-264.

Patent Abstracts of Japan, 11111295, Apr. 23, 1999, Japan Storage Battery Co., Ltd.

Goni et al., "7Li and 31P Nuclear Magnetic Resonance Studies of Li1-3xMgFexPO4"; Journal of Applied Physics, vol. 84, No. 1, Jul. 1, 1998, pp 416-421.

Nanjundaswamy et al., "Synthesis, Redox Potential Evaluation and Electrochemical Characteristics of NASICON-Related-3D Framework Compounds"; Solid State Ionics 92 (1996) pp 1-10.

Gopalakrishnan et al., "V2(PO4)3: A Novel NASICON-Type Vanadium Phosphate Synthesized by Oxidative Deintercalation of Sodium from Na3V2(PO4)3"; Chemistry of Materials, vol. 4, No. 4, Jul./Aug. 1992.

Martinez-Juarez et al., "Relationship Between Activation Energy and Bottleneck Size for Li+ Ion Conduction in NASICON Materials of Composition LiMM'(PO4)3; M, M'=Ge, Ti, Sn, Hf"; J. Phys. Chem, 1998, pp 372-375.

Cocciantelli et al., "On the $\delta \rightarrow \gamma$ Irreversible Transformation in Li/V2O5 Secondary Batteries," Solid State Ionics 78 (1995) pp 143-150.

Delmas et al., "The LixV2O5 System: An Overview of the Structure Modifications Induced by the Lithium Intercalaction"; Solid State Ionics, 69 (1994) pp 257-264.

Lutsko, V., Ion exchange and sorption processes as methods of synthesis of double phosphates and intercalated compounds, (1990), Phosphorus, Sulfur Silicon Relat. Elem., 51-52 (1-4), pp. 97-100, Abstract Provided.

Butt, G., et al., Lithium metal phosphate cathodes for Li Secondary batteries, (1998), J. Australas, Ceram. Soc., 34 (1), pp. 60-65, Abstract Provided.

Andersson, A., et al., Thermal stability of LiFePO4—based cathodes, (2000), Electrochem. Solid-State Lett., 3(2), pp. 66-68, Abstract Provided.

Garcia-Alvarado, F., et al., Structural and electrochemical characterization of electrode materials for lithium rechargeable batteries, (2000) Bol. Soc. Esp. Ceram. Vidrio, 39(3), pp. 239-243, Abstract Provided.

Amine, K., et al.; Olivine LiCoPO4 as 4.8 V electrode material for lithium batteries, (2000), Electrochem. Solid-State Lett. 3(4), pp. 178-179, Abstract Provided.

Best, A., et al., The effect of additives on ceramic materials for lithium solid electrolytes (1998), J. Australas. Ceram. Soc., 34(1), pp. 236-241.

Okada, S., et al., Cathodes properties of phospho-olivines for lithium secondary batteries, (2000), 14(2), pp. 133-137, Abstract Provided.

Amine, K., et al., Olivine LiMePO4 (Me: Co, Cu) as 4.8 V and 2 V positive electrode materials for lithium batteries, (2000), 14(2), pp. 133-137, Abstract Provided.

Padhi, A.K, et al., Phospho-Olivines as positive-electrode materials for rechargeable lithium batteries, (1997) J. Electrochem. Soc., 144(4), 1188-1194.

Padhi, A.K., et al., Effect of Structure on the Fe3+/Fe2+ redox couple in Fe phosphates, (1997) J. Electrochem. Soc. 144(5), 1609-1613.

Andersson, et al., Lithium extraction/Insertion in LiFePO4: an x-ray diffraction and Mossbauer spectroscopy study, (2000), Solid State Ionics, 130 (1,2), 41-52.

Boutinaud, P., et al., The solid solution BaLi1-xCuxPO4 (x<0.5): an example of Cu+single-ion luminescence in oxide insulators, (1996) J. Mater. Chem., 1996 6(3), 381-384.
Vaknin, et al., Weakly (x=0) and randomly (x=0.033) coupled using antiferromagnetic planes in (Li1-3xFex)NiPO4 compounds, (1999) Phys. Rev. B: Condens. Matter. Mater. Phys. 60(2), 1100-1110.
Goni, et al., 7Li and 31P nuclear magnetic resonance studies of Li1-3xMgFexPO4, (1998), Journal of Applied Physics, vol. 84 No. 1.
J.M. Cocciantelli, et al., On the irreversible transformation in Li/$V_2O_6$ secondary batteries, Solid State Ionics, 78 (1995) 143-150.
C. Delmas, et al., The $Li_xV_2O_5$ system; An overview of the structure modifications induced by the lithium intercalation, (1994) Solid State Ionics 69, 257-264.
Martinez-Juarez, et al., Relationship between Activation Energy and Bottleneck Size for Li+Ion Conduction in NASICON Materials of Composition LiMM'($PO_4$)3; M, M'=Ge,Ti, Sn, Hf, J. Phys. Chem, B 1998, 102, 372-375.
J. Gopalakrishnan; et al., $V_2(PO_4)_3$ A Novel NASICON Type Vanadium Phosphate Synthesized by Oxidative Deintercalation of Sodium from $Na_3V_2(PO_4)_3$, (1992) Chemistry of Materials, vol. 4, No. 4.
K.S. Nanjundaswamy, Synthesis, redox potential evaluation and electrochemical characteristics of NASICON—related-3D framework compounds, Solid State Ionics 92 (1996) 1-10.
International Search Report PCT/US 00/35302; PCT Search Authority.
Butt, G., et al., Lithium metal phosphate cathodes for Li Secondary batteries, (1998), J. Australas. Ceram. Soc., 34 (1), pp. 60-65.
Andersson, A., et al., Thermal stability of LiFePO4—based cathodes, (2000), Electrochem, Solid-State Lett., 3(2), pp. 66-68.
Amine, K., et al., Olivine LiCoPO4 as 4.8 V electrode material for lithium batteries, (2000), Electrochem. Solid-State Lett. 3(4), pp. 178-179.
Amine, K., et al., Olivine LiMePO4 (Me: Co, Cu) as 4.8 V and 2 V positive electrode materials for lithium batteries, (2000), 14(2), pp. Electrochem. Soc. 311-325.
Lutsko, V., Ion exchange and sorption processes as methods of synthesis of double phosphates and intercalated compounds, (1990), Phosphorus, Sulfur Silicon Relat. Elem., 51-52 (1-4), pp. 97-100.
Okada, S., et al., Cathodes Properties of Phospho-olivine for Lithium Secondary Batteries, The Reports of Institute of Advanced Material Study, Kyushu University, vol. 14, No. 2, (2000).
International Search Report for PCT/US97/15544.
Rangan et al., "New Titanium-Vanadium Phosphates of Nasicon and Langbeinite Structures, and Differences Betwen the Two Structures Toward Deintercalation of Alkali Metal," *Journal of Solid State Chemistry*, 109, (1994) pp 116-121.
Delmas et al., "The Nasicon-Type Titatium Phosphates $ATi_2(PO_4)_3$(A=Li, Na) as Electrode.Materials," *Solid State Ionics* (1988) 28-30 pp 419-423.
Hagenmuller et al., "Intercalation in 3D-Skeleton Structures: Ionic and Electronic.Features," *Material Resources Society Symposium Proc.,* vol. 210 (1991) pp 323-334.
Chem. Abstrs. Svs., (1997), XP 2048304.
Padhi et al., Lithium Intercalation into NASICON-Type Mixed Phosphates: . . . and $Li_2FeTi(PO_4)_3$; 37th Power Sources Conference; Cherry Hill, New Jersey, Conference Date: Jun. 17-20, 1996, published Oct. 15, 1996.

* cited by examiner

LITHIUM-BASED ACTIVE MATERIALS AND PREPARATION THEREOF

FIELD OF THE INVENTION

This invention relates to improved materials usable as electrode active materials and to their preparation.

BACKGROUND OF THE INVENTION

Lithium batteries are prepared from one or more lithium electrochemical cells containing electrochemically active (electroactive) materials. Such cells typically include an anode (negative electrode), a cathode (positive electrode), and an electrolyte interposed between spaced apart positive and negative electrodes. Batteries with anodes of metallic lithium and containing metal chalcogenide cathode active material are known. The electrolyte typically comprises a salt of lithium dissolved in one or more solvents, typically nonaqueous (aprotic) organic solvents. Other electrolytes are solid electrolytes typically called polymeric matrixes that contain an ionic conductive medium, typically a metallic powder or salt, in combination with a polymer that itself may be tonically conductive which is electrically insulating. By convention, during discharge of the cell, the negative electrode of the cell is defined as the anode. Cells having a metallic lithium anode and metal chalcogenide cathode are charged in an initial condition. During discharge, lithium ions from the metallic anode pass through the liquid electrolyte to the electrochemical active (electroactive) material of the cathode whereupon they release electrical energy to an external circuit.

It has recently been suggested to replace the lithium metal anode with an insertion anode, such as a lithium metal chalcogenide or lithium metal oxide. Carbon anodes, such as coke and graphite, are also insertion materials. Such negative electrodes are used with lithium-containing insertion cathodes, in order to form an electroactive couple in a cell. Such cells, in an initial condition, are not charged. In order to be used to deliver electrochemical energy, such cells must be charged in order to transfer lithium to the anode from the lithium-containing cathode. During discharge the lithium is transferred from the anode back to the cathode. During a subsequent recharge, the lithium is transferred back to the anode where it re-inserts. Upon subsequent charge and discharge, the lithium ions ($Li^+$) are transported between the electrodes. Such rechargeable batteries, having no free metallic species are called rechargeable ion batteries or rocking chair batteries. See U.S. Pat. Nos. 5,418,090; 4,464,447; 4,194,062; and 5,130,211.

Preferred positive electrode active materials include $LiCoO_2$, $LiMn_2O_4$, and $LiNiO_2$. The cobalt compounds are relatively expensive and the nickel compounds are difficult to synthesize. A relatively economical positive electrode is $LiMn_2O_4$, for which methods of synthesis are known. The lithium cobalt oxide ($LiCoO_2$), the lithium manganese oxide ($LiMn_2O_4$), and the lithium nickel oxide ($LiNiO_2$) all have a common disadvantage in that the charge capacity of a cell comprising such cathodes suffers a significant loss in capacity. That is, the initial capacity available (amp hours/gram) from $LiMn_2O_4$, $LiNiO_2$, and $LiCoO_2$ is less than the theoretical capacity because significantly less than 1 atomic unit of lithium engages in the electrochemical reaction. Such an initial capacity value is significantly diminished during the first cycle operation and such capacity further diminishes on every successive cycle of operation. For $LiNiO_2$ and $LiCoO_2$ only about 0.5 atomic units of lithium is reversibly cycled during cell operation. Many attempts have been made to reduce capacity fading, for example, as described in U.S. Pat. No. 4,828,834 by Nagaura et al. However, the presently known and commonly used, alkali transition metal oxide compounds suffer from relatively low capacity. Therefore, there remains the difficulty of obtaining a lithium-containing electrode material having acceptable capacity without disadvantage of significant capacity loss when used in a cell.

SUMMARY OF THE INVENTION

The invention provides novel lithium-mixed metal materials which, upon electrochemical interaction, release lithium ions, and are capable of reversibly cycling lithium ions. The invention provides a rechargeable lithium battery which comprises an electrode formed from the novel lithium-mixed metal materials. Methods for making the novel lithium-mixed metal materials and methods for using such lithium-mixed metal materials in electrochemical cells are also provided. The lithium-mixed metal materials comprise lithium and at least one other metal besides lithium. Preferred materials are lithium-mixed metal phosphates which contain lithium and two other metals besides lithium. Accordingly, the invention provides a rechargeable lithium battery which comprises an electrolyte; a first electrode having a compatible active material; and a second electrode comprising the novel materials. In one aspect, the novel materials are lithium-mixed metal phosphates which preferably used as a positive electrode active material, reversibly cycle lithium ions with the compatible negative electrode active material. Desirably, the lithium-mixed metal phosphate is represented by the nominal general formula $Li_a MI_b MII_c (PO_4)_d$. Such compounds include $Li_1 MI_a MII_b PO_4$ and $Li_3 MI_a MII_b (PO_4)_3$; therefore, in an initial condition $0 \leq a \leq 1$ or $0 \leq a \leq 3$, respectively. During cycling, x quantity of lithium is released where $0 \leq x \leq a$. In the general formula, the sum of b plus c is up to about 2. Specific examples are $Li_1 MI_{1-y} MII_y PO_4$ and $Li_3 MI_{2-y} MII_y (PO_4)_3$.

In one aspect, MI and MII are the same. In a preferred aspect, MI and MII are different from one another. At least one of MI and MII is an element capable of an oxidation state higher than that initially present in the lithium-mixed metal phosphate compound. Correspondingly, at least one of MI and MII has more than one oxidation state in the phosphate compound, and more than one oxidation state above the ground state $M^0$. The term oxidation state and valence state are used in the art interchangeably.

In another aspect, both MI and MII may have more than one oxidation state and both may be oxidizable from the state initially present in the phosphate compound. Desirably, MII is a metal or semi-metal having a +2 oxidation state, and is selected from Groups 2, 12 and 14 of the Periodic Table. Desirably, MII is selected from non-transition metals and semi-metals. In one embodiment, MII has only one oxidation state and is nonoxidizable from its oxidation state in the lithium-mixed metal compound. In another embodiment, MII has more than one oxidation state. Examples of semi-metals having more than one oxidation state are selenium and tellurium; other non-transition metals with more than one oxidation state are tin and lead. Preferably, MII is selected from Mg (magnesium), Ca (calcium), Zn (zinc), Sr (strontium), Pb (lead), Cd (cadmium), Sn (tin), Ba (barium), and Be (beryllium), and mixtures thereof. In another preferred aspect, MII is a metal having a +2 oxidation state and having more than one oxidation state, and is oxidizable from its oxidation state in lithium-mixed metal compound.

Desirably, MI is selected from Fe (iron), Co (cobalt), Ni (nickel), Mn (manganese), Cu (copper), V (vanadium), Sn (tin), Ti (titanium), Cr (chromium), and mixtures thereof. As can be seen, MI is preferably selected from the first row of transition metals and further includes tin, and MI preferably initially has a +2 oxidation state.

In a preferred aspect, the product $LiMI_{1-y}MII_yPO_4$ is an olivine structure and the product $Li_3MI_{1-y}(PO_4)_3$ is a rhombohedral or monoclinic Nasicon structure. In another aspect, the term "nominal formula" refers to the fact that the relative proportion of atomic species may vary slightly on the order of 2 percent to 5 percent, or more typically, 1 percent to 3 percent. In still another aspect, any portion of P (phosphorous) may be substituted by Si (silicon), S (sulfur), and/or As (arsenic); and any portion of O (oxygen) may be substituted by halogen, preferably F (fluorine). These aspects are also disclosed in U.S. patent application Ser. No. 09/105,748 filed Jun. 26, 1998, and Ser. No. 09/274,371 filed Mar. 23, 1999; and in U.S. Pat. No. 5,871,866 issued Feb. 16, 1999, which is incorporated by reference in its entirety; each of the listed applications and patents are co-owned by the assignee of the present invention.

The metal phosphates are alternatively represented by the nominal general formulas such as $Li_{1-x}MI_{1-y}MII_yPO_4$ ($0 \leq x \leq 1$), and $Li_{3-x}MI_{2-y}MII_y(PO_4)_3$ signifying capability to release and reinsert lithium. The term "general" refers to a family of compounds, with M, x and y representing variations therein. The expressions 2-y and 1-y each signify that the relative amount of MI and MII may vary. In addition, as stated above, MI may be a mixture of metals meeting the earlier stated criteria for MI. In addition, MII may be a mixture of metallic elements meeting the stated criteria for MII. Preferably, where MII is a mixture, it is a mixture of 2 metallic elements; and where MI is a mixture, it is a mixture of 2 metals. Preferably, each such metal and metallic element has a +2 oxidation state in the initial phosphate compound.

The active material of the counter electrode is any material compatible with the lithium-mixed metal phosphate of the invention. Where the lithium-mixed metal phosphate is used as a positive electrode active material, metallic lithium, lithium-containing material, or non-lithium-containing material may be used as the negative electrode active material. The negative electrode is desirably a nonmetallic insertion material. Desirably, the negative electrode comprises an active material from the group consisting of metal oxide, particularly transition metal oxide, metal chalcogenide, carbon, graphite, and mixtures thereof. It is preferred that the anode active material comprises a carbonaceous material such as graphite. The lithium-mixed metal phosphate of the invention may also be used as a negative electrode material.

In another embodiment, the present invention provides a method of preparing a compound of the nominal general formula $Li_aMI_bMII_c(PO_4)_d$ where $0<a \leq 3$; the sum of b plus c is greater than zero and up to about 2; and $0<d \leq 3$. Preferred compounds include $Li_3MI_bMII_c(PO_4)_3$ where b plus c is about 2; and $LiMI_bMII_cPO_4$ where b plus c is about 1. The method comprises providing starting materials in particle form. The starting (precursor) materials include a lithium-containing compound, one or more metal containing compounds, a compound capable of providing the phosphate $(PO_4)^{-3}$ anion, and carbon. Preferably, the lithium-containing compound is in particle form, and an example is lithium salt. Preferably, the phosphate-containing anion compound is in particle form, and examples include metal phosphate salt and diammonium hydrogen phosphate (DAHP) and ammonium dihydrogen phosphate (ADHP). The lithium compound, one or more metal compounds, and phosphate compound are included in a proportion which provides the stated nominal general formula. The starting materials are mixed together with carbon, which is included in an amount sufficient to reduce the metal ion of one or more of the metal-containing starting materials without full reduction to an elemental metal state. Excess quantities of carbon and one or more other starting materials (i.e., 5 to 10% excess) may be used to enhance product quality. A small amount of carbon, remaining after the reaction, functions as a conductive constituent in the ultimate electrode formulation. This is an advantage since such remaining carbon is very intimately mixed with the product active material. Accordingly, large quantities of excess carbon, on the order of 100% excess carbon are useable in the process. The carbon present during compound formation is thought to be intimately dispersed throughout the precursor and product. This provides many advantages, including the enhanced conductivity of the product. The presence of carbon particles in the starting materials is also thought to provide nucleation sites for the production of the product crystals.

The starting materials are intimately mixed and then reacted together where the reaction is initiated by heat and is preferably conducted in a nonoxidizing, inert atmosphere, whereby the lithium, metal from the metal compound(s), and phosphate combine to form the $Li_aMI_bMII_c(PO_4)_d$ product. Before reacting the compounds, the particles are intermingled to form an essentially homogeneous powder mixture of the precursors. In one aspect, the precursor powders are dry-mixed using a ball mill, such as zirconia media. Then the mixed powders are pressed into pellets. In another aspect, the precursor powders are mixed with a binder. The binder is selected so as to not inhibit reaction between particles of the powders. Therefore, preferred binders decompose or evaporate at a temperature less than the reaction temperature. Examples include mineral oils (i.e., glycerol, or C-18 hydrocarbon mineral oil) and polymers which decompose (carbonize) to form a carbon residue before the reaction starts, or which evaporate before the reaction starts. In still another aspect, intermingling is conducted by forming a wet mixture using a volatile solvent and then the intermingled particles are pressed together in pellet form to provide good grain-to-grain contact.

Although it is desired that the precursor compounds be present in a proportion which provides the stated general formula of the product, the lithium compound may be present in an excess amount on the order of 5 percent excess lithium compared to a stoichiometric mixture of the precursors. And the carbon may be present at up to 100% excess compared to the stoichiometric amount. The method of the invention may also be used to prepare other novel products, and to prepare known products. A number of lithium compounds are available as precursors, such as lithium acetate ($LiOOCCH_3$), lithium hydroxide, lithium nitrate ($LiNO_3$), lithium oxalate ($Li_2C_2O_4$), lithium oxide ($Li_2O$), lithium phosphate ($Li_3PO_4$), lithium dihydrogen phosphate ($LiH_2PO_4$), lithium vanadate ($LiVO_3$), and lithium carbonate ($Li_2CO_3$). The lithium carbonate is preferred for the solid state reaction since it has a very high melting point and commonly reacts with the other precursors before melting. Lithium carbonate has a melting point over 600° C. and it decomposes in the presence of the other precursors and/or effectively reacts with the other precursors before melting. In contrast, lithium hydroxide melts at about 400° C. At some reaction temperatures preferred herein of over 450° C. the lithium hydroxide will melt before any significant reaction with the other precursors occurs to an effective extent. This melting renders the reaction very difficult to control. In addition, anhydrous LiOH is highly hygroscopic and a significant quantity of water is released during the reaction. Such water needs to be removed from the oven and the resultant product may need to be dried. In one preferred aspect, the solid state reaction made possible by the present invention is much preferred since it is conducted at temperatures at which the lithium-containing compound reacts with the other reactants before melting. Therefore, lithium hydroxide is useable as a precursor in the method of the invention in combination with some precursors, particularly the phosphates. The method of the invention is able to be conducted as an economical carbothermal-based process with a wide variety of precursors and over a relatively broad temperature range.

The aforesaid precursor compounds (starting materials) are generally crystals, granules, and powders and are generally referred to as being in particle form. Although many types of phosphate salts are known, it is preferred to use diammonium hydrogen phosphate $(NH_4)_2HPO_4$ (DAHP) or ammonium dihydrogen phosphate $(NH_4)H_2PO_4$(ADHP). Both ADHP and DAHP meet the preferred criteria that the precursors decompose in the presence of one another or react with one another before melting of such precursor. Exemplary metal compounds are $Fe_2O_3$, $Fe_3O_4$, $V_2O_5$, $VO_2$, $LiVO_3$, $NH_4VO_3$, $Mg(OH)_2$, $Cao$, $MgO$, $Ca(OH)_2$, $MnO_2$, $Mn_2O_3$, $Mn_3(PO_4)_2$, $CuO$, $SnO$, $SnO_2$, $TiO_2$, $Ti_2O_3$, $Cr_2O_3$, $PbO_2$, $PbO$, $Ba(OH)_2$, $BaO$, $Cd(OH)_2$. In addition, some starting materials serve as both the source of metal ion and phosphate, such as $FePO_4$, $Fe_3(PO_4)_2$, $Zn_3(PO_4)_2$, and $Mg_3(PO_4)_2$. Still others contain both lithium ion and phosphate such as $Li_3PO_4$ and $LiH_2PO_4$. Other exemplary precursors are $H_3PO_4$ (phosphoric acid); and $P_2O_5(P_4O_{10})$ phosphoric oxide; and $HPO_3$ meta phosphoric acid, which is a decomposition product of $P_2O_5$. If it is desired to replace any of the oxygen with a halogen, such as fluorine, the starting materials further include a fluorine compound such as LiF. If it is desired to replace any of the phosphorous with silicon, then the starting materials further include silicon oxide ($SiO_2$). Similarly, ammonium sulfate in the starting materials is useable to replace phosphorus with sulfur.

The starting materials are available from a number of sources. The following are typical. Vanadium pentoxide of the formula $V_2O_5$ is obtainable from any number of suppliers including Kerr McGee, Johnson Matthey, or Alpha Products of Davers, Mass. Vanadium pentoxide has a CAS number of 1314-62-1. Iron oxide $Fe_3O_3$ is a common and very inexpensive material available in powder form from the same suppliers. The other precursor materials mentioned above are also available from well known suppliers, such as those listed above.

The method of the invention may also be used to react starting materials in the presence of carbon to form a variety of other novel products, such as gamma-$LiV_2O_5$ and also to produce known products. Here, the carbon functions to reduce metal ion of a starting metal compound to provide a product containing such reduced metal ion. The method is particularly useful to also add lithium to the resultant product, which thus contains the metallic element ions, namely, the lithium ion and the other metal ion, thereby forming a mixed metal product. An example is the reaction of vanadium pentoxide ($V_2O_5$) with lithium carbonate in the presence of carbon to form gamma-$LiV_2O_5$. Here the starting metal ion $V^{+5}V^{+5}$ is reduced to $V^{+4}V^{+5}$ in the final product. A single phase gamma-$LiV_2O_5$ product is not known to have been directly and independently formed before.

As described earlier, it is desirable to conduct the reaction at a temperature where the lithium compound reacts before melting. The temperature should be about 400° C. or greater, and desirably 450° C. or greater, and preferably 500° C. or greater, and generally will proceed at a faster rate at higher temperatures. The various reactions involve production of CO or $CO_2$ as an effluent gas. The equilibrium at higher temperature favors CO formation. Some of the reactions are more desirably conducted at temperatures greater than 600° C.; most desirably greater than 650° C.; preferably 700° C. or greater; more preferably 750° C. or greater. Suitable ranges for many reactions are about 700 to 950° C., or about 700 to 800° C.

Generally, the higher temperature reactions produce CO effluent and the stoichiometry requires more carbon be used than the case where $CO_2$ effluent is produced at lower temperature. This is because the reducing effect of the C to $CO_2$ reaction is greater than the C to CO reaction. The C to $CO_2$ reaction involves an increase in carbon oxidation state of +4 (from 0 to 4) and the C to CO reaction involves an increase in carbon oxidation state of +2 (from ground state zero to 2). Here, higher temperature generally refers to a range of about 650° C. to about 1000° C. and lower temperature refers to up to about 650° C. Temperatures higher than 1200° C. are not thought to be needed.

In one aspect, the method of the invention utilizes the reducing capabilities of carbon in a unique and controlled manner to produce desired products having structure and lithium content suitable for electrode active materials. The method of the invention makes it possible to produce products containing lithium, metal and oxygen in an economical and convenient process. The ability to lithiate precursors, and change the oxidation state of a metal without causing abstraction of oxygen from a precursor is heretofore unexpected. These advantages are at least in part achieved by the reductant, carbon, having an oxide whose free energy of formation becomes more negative as temperature increases. Such oxide of carbon is more stable at high temperature than at low temperature. This feature is used to produce products having one or more metal ions in a reduced oxidation state relative to the precursor metal ion oxidation state. The method utilizes an effective combination of quantity of carbon, time and temperature to produce new products and to produce known products in a new way.

Referring back to the discussion of temperature, at about 700° C. both the carbon to carbon monoxide and the carbon to carbon dioxide reactions are occurring. At closer to 600° C. the C to $CO_2$ reaction is the dominant reaction. At closer to 800° C. the C to CO reaction is dominant. Since the reducing effect of the C to $CO_2$ reaction is greater, the result is that less carbon is needed per atomic unit of metal to be reduced. In the case of carbon to carbon monoxide, each atomic unit of carbon is oxidized from ground state zero to plus 2. Thus, for each atomic unit of metal ion (M) which is being reduced by one oxidation state, one half atomic unit of carbon is required. In the case of the carbon to carbon dioxide reaction, one quarter atomic unit of carbon is stoichiometrically required for each atomic unit of metal ion (M) which is reduced by one oxidation state, because carbon goes from ground state zero to a plus 4 oxidation state. These same relationships apply for each such metal ion being reduced and for each unit reduction in oxidation state desired.

It is preferred to heat the starting materials at a ramp rate of a fraction of a degree to 10° C. per minute and preferably about 2° C. per minute. Once the desired reaction temperature is attained, the reactants (starting materials) are held at the reaction temperature for several hours. The heating is preferably conducted under non-oxidizing or inert gas such as argon or vacuum. Advantageously, a reducing atmosphere is not required, although it may be used if desired. After reaction, the products are preferably cooled from the elevated temperature to ambient (room) temperature (i.e., 10° C. to 40° C.). Desirably, the cooling occurs at a rate similar to the earlier ramp rate, and preferably 2° C./minute cooling. Such cooling rate has been found to be adequate to achieve the desired structure of the final product. It is also possible to quench the products at a cooling rate on the order of about 100° C./minute. In some instances, such rapid cooling (quench) may be preferred.

The present invention resolves the capacity problem posed by widely used cathode active material. It has been found that the capacity and capacity retention of cells having the preferred active material of the invention are improved over conventional materials. Optimized cells containing lithium-mixed metal phosphates of the invention potentially have performance improved over commonly used lithium metal oxide compounds. Advantageously, the new method of making the novel lithium-mixed metal phosphate compounds of the invention is relatively economical and readily adaptable to commercial production.

Objects, features, and advantages of the invention include an electrochemical cell or battery based on lithium-mixed metal phosphates. Another object is to provide an electrode active material which combines the advantages of good discharge capacity and capacity retention. It is also an object of the present invention to provide electrodes which can be manufactured economically. Another object is to provide a method for forming electrode active material which lends itself to commercial scale production for preparation of large quantities.

These and other objects, features, and advantages will become apparent from the following description of the preferred embodiments, claims, and accompanying drawings.

BRIEF DESCRIPTION OF THE DRAWINGS

FIG. 3 shows the excellent rechargeability of the lithium iron phosphate/lithium metal cell, and also shows the excellent cycling and specific capacity (mAh/g) of the active material.

FIG. 6 shows the excellent rechargeability of the lithium-metal-phosphate/lithium metal cell, and also shows the excellent cycling and capacity of the cell.

FIG. 13 shows the excellent rechargeability of the lithium-metal-oxide/lithium metal cell. FIG. 13 shows the excellent cycling and capacity of the cell.

FIG. 18 shows the excellent rechargeability of the lithium-metal-phosphate/lithium metal cell, and also shows the excellent cycling and capacity of the cell.

FIG. 20 shows the excellent rechargeability of the lithium-metal-phosphate/graphite cell. FIG. 20 shows the excellent cycling and capacity of the cell.

DETAILED DESCRIPTION OF THE PREFERRED EMBODIMENTS

Figure 1:
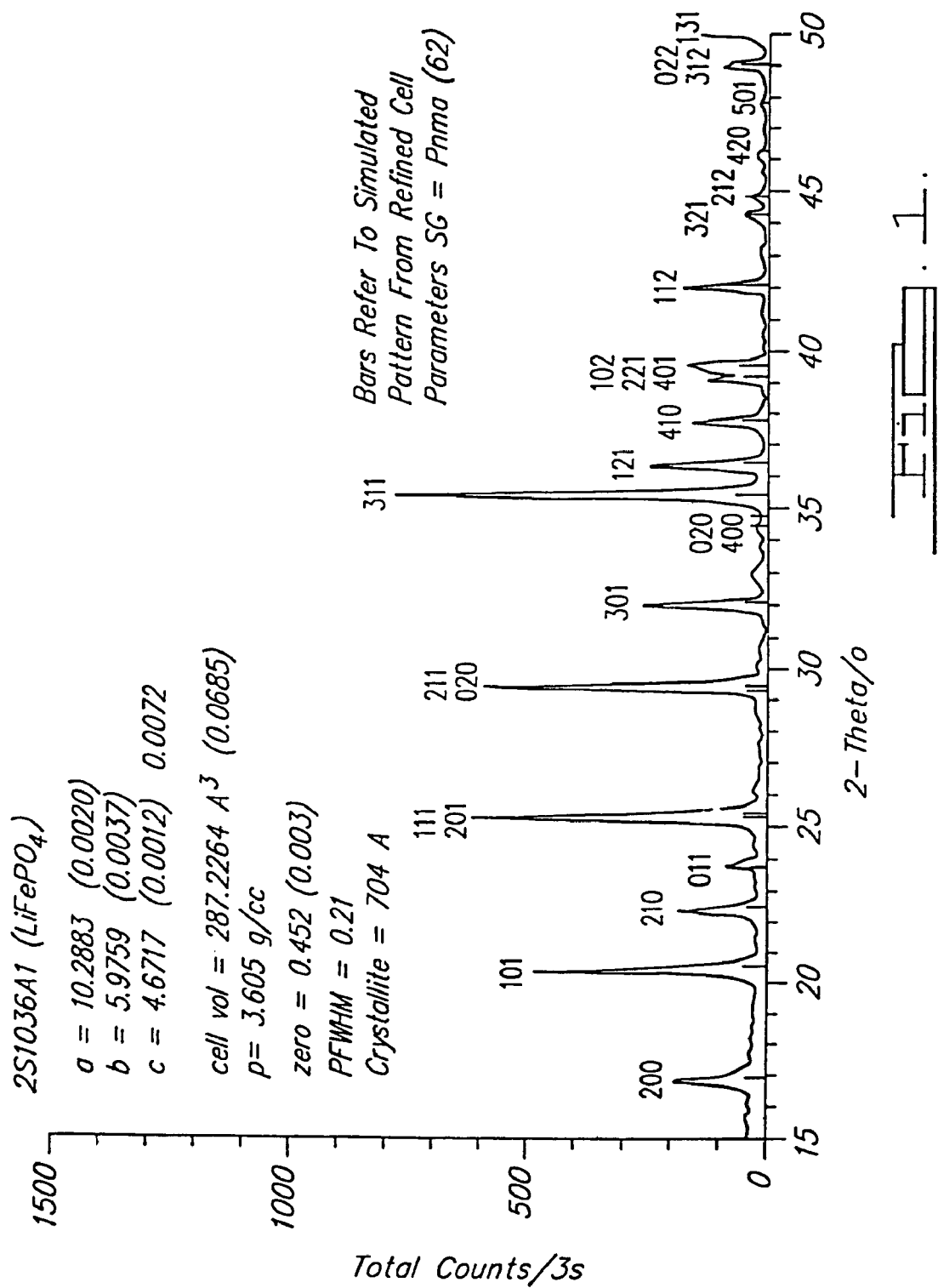
FIG. 1 shows the results of an x-ray diffraction analysis, of the LiFePO$_4$ prepared according to the invention using CuKα radiation, λ=1.5405 Å. Bars refer to simulated pattern from refined cell parameters, Space Group, SG=Pnma (62). The values are a=10.2883 Å (0.0020), b=5.9759 Å (0.0037), c=4.6717 Å (0.0012) 0.0072, cell volume=287.2264 Å$^3$ (0.0685). Density, p=3.605 g/cc, zero=0.452 (0.003). Peak at full width half maximum, PFWHM=0.21. Crystallite size from XRD data=704 Å.

The present invention provides lithium-mixed metal-phosphates, which are usable as electrode active materials, for lithium ($Li^+$) ion removal and insertion. Upon extraction of the lithium ions from the lithium-mixed-metal-phosphates, significant capacity is achieved. In one aspect of the invention, electrochemical energy is provided when combined with a suitable counter electrode by extraction of a quantity x of lithium from lithium-mixed-metal-phosphates $Li_{a-x}MI_bMII_c(PO_4)_d$. When a quantity x of lithium is removed per formula unit of the lithium-mixed-metal phosphate, metal MI is oxidized. In another aspect, metal MII is also oxidized. Therefore, at least one of MI and MII is oxidizable from its initial condition in the phosphate compound as Li is removed. Consider the following which illustrate the mixed metal compounds of the invention: $LiFe_{1-y}Sn_yPO_4$, has two oxidizable elements, Fe and Sn; in contrast, $LiFe_{1-y}Mg_yPO_4$ has one oxidizable metal, the metal Fe.

In another aspect, the invention provides a lithium ion battery which comprises an electrolyte; a negative electrode having an insertion active material; and a positive electrode comprising a lithium-mixed-metal-phosphate active material characterized by an ability to release lithium ions for insertion into the negative electrode active material. The lithium-mixed-metal-phosphate is desirably represented by the nominal general formula $Li_aMI_bMII_c(PO_4)_d$. Although the metals MI and MII may be the same, it is preferred that the metals MI and MII are different. Desirably, in the phosphate compound MI is a metal selected from the group: Fe, Co, Ni, Mn, Cu, V, Sn, Ti, Cr and mixtures thereof, and MI is most desirably a transition metal or mixture thereof selected from said group. Most preferably, MI has a +2 valence or oxidation state.

In another aspect, MII is selected from Mg, Ca, Zn, Sr, Pb, Cd, Sn, Ba, Be, and mixtures thereof. Most preferably, MII has a +2 valence or oxidation state. The lithium-mixed-metal-phosphate is preferably a compound represented by the nominal general formula $Li_{a-x}MI_bMII_c(PO_4)_d$, signifying the preferred composition and its capability to release x lithium. Accordingly, during cycling, charge and discharge, the value of x varies as x greater than or equal to 0 and less than or equal to a. The present invention resolves a capacity problem posed by conventional cathode active materials. Such problems with conventional active materials are described by Tarascon in U.S. Pat. No. 5,425,932, using $LiMn_2O_4$ as an example. Similar problems are observed with $LiCoO_2$, $LiNiO_2$, and many, if not all, lithium metal chalcogenide materials. The present invention demonstrates that significant capacity of the cathode active material is utilizable and maintained.

A preferred novel procedure for forming the lithium-mixed-metal-phosphate $Li_aMI_bMII_c(PO_4)_d$ compound active material will now be described. In addition, the preferred novel procedure is also applicable to formation of other lithium metal compounds, and will be described as such. The basic procedure will be described with reference to exemplary starting materials but is not limited thereby. The basic process comprises conducting a reaction between a lithium compound, preferably lithium carbonate ($Li_2CO_3$), metal compound(s), for example, vanadium pentoxide ($V_2O_5$), iron oxide ($Fe_2O_3$), and/or manganese hydroxide, and a phosphoric acid derivative, preferably the phosphoric acid ammonium salt, diammonium hydrogen phosphate, $(NH_4)_2H(PO_4)$. Each of the precursor starting materials are available from a number of chemical outfits including Aldrich Chemical Company and Fluka. Using the method described herein, $LiFePO_4$ and $LiFe_{0.9}Mg_{0.1}PO_4$, $Li_3V_2(PO_4)_3$ were prepared with approximately a stoichiometric amount of $Li_2CO_3$, the respective metal compound, and $(NH_4)_2HPO_4$. Carbon powder was included with these precursor materials. The precursor materials were initially intimately mixed and dry ground for about 30 minutes. The intimately mixed compounds were then pressed into pellets. Reaction was conducted by heating in an oven at a preferred ramped heating rate to an elevated temperature, and held at such elevated temperature for several hours to complete formation of the reaction product. The entire reaction was conducted in a non-oxidizing atmosphere, under flowing pure argon gas. The flow rate will depend upon the size of the oven and the quantity needed to maintain the atmosphere. The oven was permitted to cool down at the end of the reaction period, where cooling occurred at a desired rate under argon. Exemplary and preferred ramp rates, elevated reaction temperatures and reaction times are described herein. In one aspect, a ramp rate of 2°/minute to an elevated temperature in a range of 750° C. to 800° C. was suitable along with a dwell (reaction time) of 8 hours. Refer to Reactions 1, 2, 3 and 4 herein. In another variation per Reaction 5, a reaction temperature of 600° C. was used along with a dwell time of about one hour. In still another variation, as per Reaction 6, a two-stage heating was conducted, first to a temperature of 300° C. and then to a temperature of 850°.

The general aspects of the above synthesis route are applicable to a variety of starting materials. Lithium-containing compounds include $Li_2O$ (lithium oxide), $LiH_2PO_4$ (lithium hydrogen phosphate), $Li_2C_2O_4$(lithium oxalate), LiOH (lithium hydroxide), $LiOH.H_2O$ (lithium hydroxide monohydrate), and $LiHCO_3$ (lithium hydrogen carbonate). The metal compounds(s) are reduced in the presence of the reducing agent, carbon. The same considerations apply to other lithium-metal- and phosphate-containing precursors. The thermodynamic considerations such as ease of reduction, of the selected precursors, the reaction kinetics, and the melting point of the salts will cause adjustment in the general procedure, such as, amount of carbon reducing agent, and the temperature of reaction.

FIGS. 1 through 21 which will be described more particularly below show characterization data and capacity in actual use for the cathode materials (positive electrodes) of the invention. Some tests were conducted in a cell comprising a lithium metal counter electrode (negative electrode) and other tests were conducted in cells having a carbonaceous counter electrode. All of the cells had an EC:DMC-$LiPF_6$ electrolyte.

Typical cell configurations will now be described with reference to FIGS. 22 and 23; and such battery or cell utilizes the novel active material of the invention. Note that the preferred cell arrangement described here is illustrative and the invention is not limited thereby. Experiments are often performed, based on full and half cell arrangements, as per the following description. For test purposes, test cells are often fabricated using lithium metal electrodes. When forming cells for use as batteries, it is preferred to use an insertion positive electrode as per the invention and a graphitic carbon negative electrode.

Figure 22:
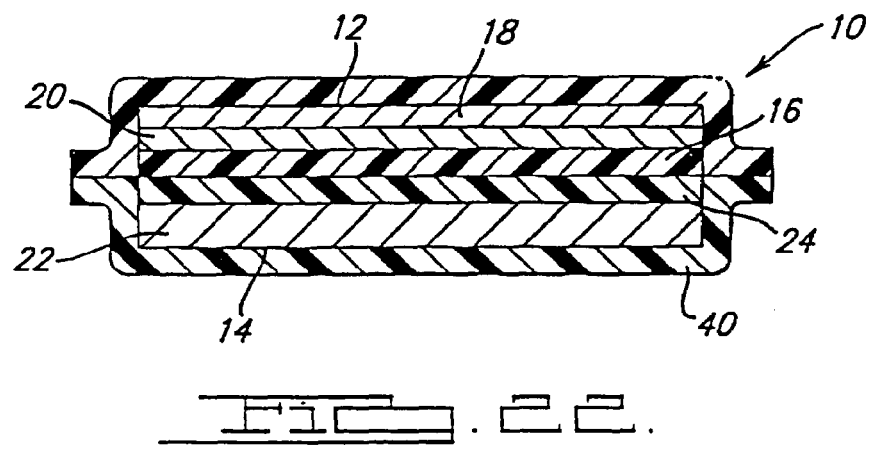
FIG. 22 is a diagrammatic representation of a typical laminated lithium-ion battery cell structure.

A typical laminated battery cell structure 10 is depicted in FIG. 22. It comprises a negative electrode side 12, a positive electrode side 14, and an electrolyte/separator 16 there between. Negative electrode side 12 includes current collector 18, and positive electrode side 14 includes current collector 22. A copper collector foil 18, preferably in the form of an open mesh grid, upon which is laid a negative electrode membrane 20 comprising an insertion material such as carbon or graphite or low-voltage lithium insertion compound, dispersed in a polymeric binder matrix. An electrolyte/separator film 16 membrane is preferably a plasticized copolymer. This electrolyte/separator preferably comprises a polymeric separator and a suitable electrolyte for ion transport. The electrolyte/separator is positioned upon the electrode element and is covered with a positive electrode membrane 24 comprising a composition of a finely divided lithium insertion compound in a polymeric binder matrix. An aluminum collector foil or grid 22 completes the assembly. Protective bagging material 40 covers the cell and prevents infiltration of air and moisture.

Figure 23:
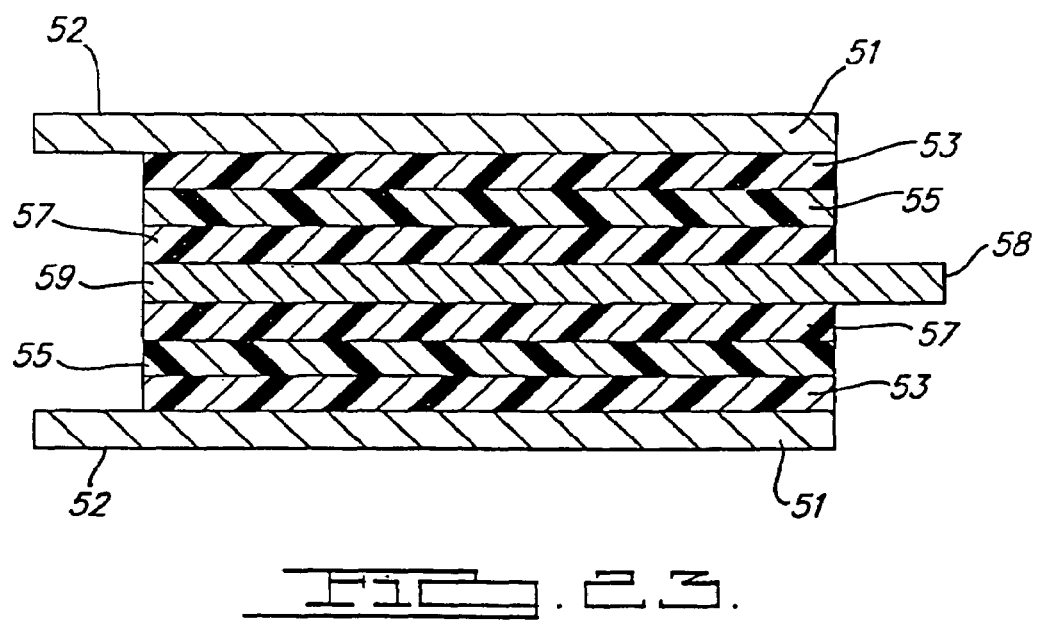
FIG. 23 is a diagrammatic representation of a typical multi-cell battery cell structure.

In another embodiment, a multi-cell battery configuration as per FIG. 23 is prepared with copper current collector 51, negative electrode 53, electrolyte/separator 55, positive electrode 57, and aluminum current collector 59. Tabs 52 and 58 of the current collector elements form respective terminals for the battery structure. As used herein, the terms "cell" and "battery" refer to an individual cell comprising anode/electrolyte/cathode and also refer to a multi-cell arrangement in a stack.

The relative weight proportions of the components of the positive electrode are generally: 50–90% by weight active material; 5–30% carbon black as the electric conductive diluent; and 3–20% binder chosen to hold all particulate materials in contact with one another without degrading ionic conductivity. Stated ranges are not critical, and the amount of active material in an electrode may range from 25–95 weight percent. The negative electrode comprises about 50–95% by weight of a preferred graphite, with the balance constituted by the binder. A typical electrolyte separator film comprises approximately two parts polymer for every one part of a preferred fumed silica. The conductive solvent comprises any number of suitable solvents and salts. Desirable solvents and salts are described in U.S. Pat. Nos. 5,643,695 and 5,418,091. One example is a mixture of EC:DMC:$LiPF_6$ in a weight ratio of about 60:30:10.

Solvents are selected to be used individually or in mixtures, and include dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, etc. The preferred solvents are EC/DMC, EC/DEC, EC/DPC and EC/EMC. The salt content ranges from 5% to 65% by weight, preferably from 8% to 35% by weight.

Those skilled in the art will understand that any number of methods are used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

Separator membrane element 16 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

In the construction of a lithium-ion battery, a current collector layer of aluminum foil or grid is overlaid with a positive electrode film, or membrane, separately prepared as a coated layer of a dispersion of insertion electrode composition. This is typically an insertion compound such as $LiMn_2O_4$(LMO), $LiCoO_2$, or $LiNiO_2$, powder in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Examples of forming cells containing metallic lithium anode, insertion electrodes, solid electrolytes and liquid electrolytes can be found in U.S. Pat. Nos. 4,668,595; 4,830,939; 4,935,317; 4,990,413; 4,792,504; 5,037,712; 5,262,253; 5,300,373; 5,435,054; 5,463,179; 5,399,447; 5,482,795 and 5,411,820; each of which is incorporated herein by reference in its entirety. Note that the older generation of cells contained organic polymeric and inorganic electrolyte matrix materials, with the polymeric being most preferred. The polyethylene oxide of U.S. Pat. No. 5,411,820 is an example. More modern examples are the VdF:HFP polymeric matrix. Examples of casting, lamination and formation of cells using VdF:HFP are as described in U.S. Pat. Nos. 5,418,091; 5,460,904; 5,456,000; and 5,540,741; assigned to Bell Communications Research, each of which is incorporated herein by reference in its entirety.

As described earlier, the electrochemical cell operated as per the invention, may be prepared in a variety of ways. In one embodiment, the negative electrode may be metallic lithium. In more desirable embodiments, the negative electrode is an insertion active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. For test purposes, test cells are often fabricated using lithium metal electrodes. When forming cells for use as batteries, it is preferred to use an insertion metal oxide positive electrode and a graphitic carbon negative electrode. Various methods for fabricating electrochemical cells and batteries and for forming electrode components are described herein. The invention is not, however, limited by any particular fabrication method.

Formation of Active Materials

EXAMPLE I

Reaction 1(a). $LiFePO_4$ formed from $FePO_4$

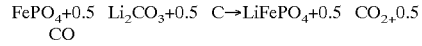

(a) Pre-mix reactants in the following proportions using ball mill. Thus,

| 1 mol $FePO_4$ | 150.82 g |
| 0.5 mol $Li_2CO_3$ | 36.95 g |
| 0.5 mol carbon | 6.0 g |

(but use 100% excess carbon→12.00 g)
(b) Pelletize powder mixture
(c) Heat pellet to 750° C. at a rate of 2°/minute in flowing inert atmosphere (e.g. argon). Dwell for 8 hours at 750° C. under argon.
(d) Cool to room temperature at 2°/minute under argon.
(e) Powderize pellet.
Note that at 750° C. this is predominantly a CO reaction. This reaction is able to be conducted at a temperature in a range of about 700° C. to about 950° C. in argon as shown, and also under other inert atmospheres such as nitrogen or vacuum.

EXAMPLE II

Reaction 1(b). $LiFePO_4$ formed from $Fe_2O_3$

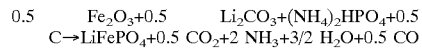

(a) Premix powders in the following proportions

| 0.5 mol $Fe_2O_3$ | 79.85 g |
| 0.5 mol $Li_2CO_3$ | 36.95 g |
| 1 mol $(NH_4)_2HPO_4$ | 132.06 g |
| 0.5 mol carbon | 6.00 g |

(use 100% excess carbon→12.00 g)
(b) Pelletize powder mixture
(c) Heat pellet to 750° C. at a rate of 2°/minute in flowing inert atmosphere (e.g. argon). Dwell for 8 hours at 750° C. under argon.
(d) Cool to room temperature at 2°/minute under argon.
(e) Powderize

EXAMPLE III

Reaction 1(c). $LiFePO_4$—from $Fe_3(PO_4)_2$
Two steps:
Part I. Carbothermal Preparation of $Fe_3(PO_4)_2$ $$3/2\ Fe_2O_3 + 2(NH_4)_2HPO_4 + 3/2\ C \rightarrow Fe_3(PO_4)_2 + 3/2\ CO + 4NH_3 + 5/2\ H_2O$$

(a) Premix reactants in the following proportions

| | |
|---|---|
| 3/2 mol $Fe_2O_3$ | 239.54 g |
| 2 mol $(NH_4)_2HPO_4$ | 264.12 g |
| 3/2 mol carbon | 18.00 g |

(use 100% excess carbon→36.00 g)
(b) Pelletize powder mixture
(c) Heat pellet to 800° C. at a rate of 2°/minute in flowing inert atmosphere (e.g. argon). Dwell for 8 hours at 750° C. under argon.
(d) Cool to room temperature at 2° C./minute under argon.
(e) Powderize pellet.
Part II. Preparation of $LiFePO_4$ from the $Fe_3(PO_4)_2$ of Part I.

$$Li_3PO_4 + Fe(PO_4)_2 \rightarrow 3\ LiFePO_4$$

(a) Premix reactants in the following proportions

| | |
|---|---|
| 1 mol $Li_3PO_4$ | 115.79 g |
| 1 mol $Fe_3(PO_4)_2$ | 357.48 g |

(b) Pelletize powder mixture
(c) Heat pellet to 750° C. at a rate of 2°/minute in flowing inert atmosphere (e.g. argon). Dwell for 8 hours at 750° C. under argon.
(d) Cool to room temperature at 2° C./minute under argon.
(e) Powderize pellet.

EXAMPLE IV

Reaction 2(a). $LiFe_{0.9}Mg_{0.1}PO_4(LiFe_{1-y}Mg_yPO_4)$ formed from $FePO_4$ $$0.5\ Li_2CO_3 + 0.9\ FePO_4 + 0.1\ Mg(OH)_2 + 0.1(NH_4)_2HPO_4 + 0.45C \rightarrow LiFe_{0.9}Mg_{0.1}PO_4 + 0.5CO_2 + 0.45CO + 0.2NH_3 + 0.25\ H_2O$$

(a) Pre-mix reactants in the following proportions
0.50 mol $Li_2CO_3$=36.95 g
0.90 mol $FePO_4$=135.74 g
0.10 mol $Mg(OH)_2$=5.83 g
0.10 mol $(NH_4)_2HPO_4$=1.32 g
0.45 mol carbon=5.40 g
(use 100% excess carbon→10.80g)
(b) Pelletize powder mixture
(c) Heat to 750° C. at a rate of 2°/minute in argon. Hold for 8 hours dwell at 750° C. in argon
(d) Cool at a rate of 2°/minute
(e) Powderize pellet.

EXAMPLE V

Reaction 2(b). $LiFe_{0.9}Mg_{0.1}PO_4(LiFe_{1-y}Mg_yPO_4)$ formed from $Fe_2O_3$ $$0.50\ Li_2CO_3 + 0.45\ Fe_2O_3 + 0.10\ Mg(OH)_2 + (NH_4)_2HPO_4 + 0.45C \rightarrow LiFe_{0.9}Mg_{0.1}PO_4 + 0.5\ CO_2 + 0.45\ CO + 2\ NH_3 + 1.6\ H_2O$$

(a) Pre-mix reactants in following ratio
0.50 mol $Li_2CO_3$=36.95 g
0.45 mol $Fe_2O_3$=71.86 g
0.10 mol $Mg(OH)_2$=5.83 g
1.00 mol $(NH_4)_2HPO_4$=132.06 g
0.45 mol carbon=5.40 g
(use 100% excess carbon→10.80 g)
(b) Pelletize powder mixture
(c) Heat to 750° C. at a rate of 2°/minute in argon. Hold for 8 hours dwell at 750° C. in argon
(d) Cool at a rate of 2°/minute
(e) Powderize pellet.

EXAMPLE VI

Reaction 2(c). $LiFe_{0.9}Mg_{0.1}PO_4(LiFe_{1-y}Mg_yPO_4)$ formed from $LiH_2PO_4$ $$1.0\ LiH_2PO_4 + 0.45\ Fe_2O_3 + 0.10\ Mg(OH)_2 + 0.45C \rightarrow LiFe_{0.9}Mg_{0.1}PO_4 + 0.45\ CO + 1.1\ H_2O$$

(a) Pre-mix reactants in the following proportions
1.00 mol $LiH_2PO_4$=103.93 g
0.45 mol $Fe_2O_3$=71.86 g
0.10 mol $Mg(OH)_2$=5.83 g
0.45 mol carbon=5.40 g
(use 100% excess carbon→10.80 g)
(b) Pelletize powder mixture
(c) Heat to 750° C. at a rate of 2°/minute in argon. Hold for 8 hours dwell at 750° C. in argon
(d) Cool at a rate of 2°/minute
(e) Powderize pellet.

EXAMPLE VII

Reaction 3. Formation of $LiFe_{0.9}Ca_{0.1}PO_4$ ($LiFe_{1-y}Ca_yPO_4$) from $Fe_2O_3$ $$0.50\ Li_2CO_3 + 0.45\ Fe_2O_3 + 0.1\ Ca(OH)_2 + (NH_4)_2HPO_4 + 0.45C \rightarrow LiFe_{0.9}Ca_{0.1}PO_4 + 0.5\ CO_2 + 0.45\ CO + 2\ NH_3 + 1.6\ H_2O$$

(a) Pre-mix reactants in the following proportions
0.50 mol $Li_2CO_3$=36.95 g
0.45 mol $Fe_2O_3$=71.86 g
0.10 mol $Ca(OH)_2$=7.41 g
1.00 mol $(NH_4)_2HPO_4$=132.06 g
0.45 mol carbon=5.40 g
(100% excess carbon→10.80 g)
(b) Pelletize powder mixture
(c) Heat to 750° C. at a rate of 2°/minute in argon. Hold for 8 hours dwell at 750° C. in argon
(d) Cool at a rate of 2°/minute
(e) Powderize pellet.

EXAMPLE VIII

Reaction 4. Formation of $LiFe_{0.9}Zn_{0.1}PO_4$ ($LiFe_{1-y}Zn_yPO_4$) from $Fe_2O_3$.

$$0.50\ Li_2CO_3 + 0.45\ Fe_2O_3 + 0.033\ Zn_3(PO_4)_2 + 0.933(NH_4)_2HPO_4 + 0.45\ C \rightarrow LiFe_{0.9}Zn_{0.1}PO_4 + 0.50\ CO_2 + 0.45\ CO + 1.866\ NH_3 + 1.2H_2O$$

Pre-mix reactants in the following proportions
0.50 mol $Li_2CO_3$=36.95 g
0.45 mol $Fe_2O_3$=71.86 g
0.033 mol $Zn_3(PO_4)_2$=12.74 g
0.933 mol $(NH_4)_2HPO_4$=123.21 g
0.45 mol carbon=5.40 g (100% excess carbon→10.80 g)
(b) Pelletize powder mixture
(c) Heat to 750° C. at a rate of 2°/minute in argon. Hold for 8 hours dwell at 750° C. in argon
(d) Cool at a rate of 2°/minute
(e) Powderize pellet.

EXAMPLE IX

Reaction 5. Formation of gamma-$LiV_2O_5(\gamma)$

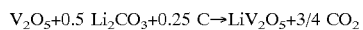
$V_2O_5 + 0.5\ Li_2CO_3 + 0.25\ C \rightarrow LiV_2O_5 + 3/4\ CO_2$ (a) Pre-mix alpha $V_2O_5$, $Li_2CO_3$ and Shiwinigan Black (carbon) using ball mix with suitable media. Use a 25% weight excess of carbon over the reaction amounts above. For example, according to reaction above: Need:

| | | |
|---|---|---|
| 1 mol | $V_2O_5$ | 181.88 g |
| 0.5 mol | $Li_2CO_3$ | 36.95 g |
| 0.25 mol | carbon | 3.00 g |

(but use 25% excess carbon→3.75 g)
(b) Pelletize powder mixture
(c) Heat pellet to 600° C. in flowing argon (or other inert atmosphere) at a heat rate of approximately 2°/minute. Hold at 600° C. for about 60 minutes.
(d) Allow to cool to room temperature in argon at cooling rate of about 2°/minute.
(e) Powderize pellet using mortar and pestle This reaction is able to be conducted at a temperature in a range of about 400° C. to about 650° C. in argon as shown, and also under other inert atmospheres such as nitrogen or vacuum. This reaction at this temperature range is primarily $C \rightarrow CO_2$. Note that the reaction $C \rightarrow CO$ primarily occurs at a temperature over about 650° C. (HT, high temperature); and the reaction $C \rightarrow CO_2$ primarily occurs at a temperature of under about 650° C. (LT, low temperature). The reference to about 650° C. is approximate and the designation "primarily" refers to the predominant reaction thermodynamically favored although the alternate reaction may occur to some extent.

EXAMPLE X

Reaction 6. Formation of $Li_3V_2(PO_4)_3$

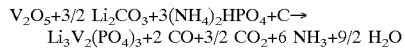
$V_2O_5 + 3/2\ Li_2CO_3 + 3(NH_4)_2HPO_4 + C \rightarrow$
$Li_3V_2(PO_4)_3 + 2\ CO + 3/2\ CO_2 + 6\ NH_3 + 9/2\ H_2O$ (a) Pre-mix reactants above using ball mill with suitable media. Use a 25% weight excess of carbon. Thus,

| | | |
|---|---|---|
| 1 mol | $V_2O_5$ | 181.88 g |
| 3/2 mol | $Li_2CO_3$ | 110.84 g |
| 3 mol | $(NH_4)_2HPO_4$ | 396.18 g |
| 1 mol | carbon | 12.01 g |

(but use 25% excess carbon→15.01 g)
(b) Pelletize powder mixture
(c) Heat pellet at 2°/minute to 300° C. to remove $CO_2$ (from $Li_2CO_3$) and to remove $NH_3$, $H_2O$. Heat in an inert atmosphere (e.g. argon). Cool to room temperature.
(d) Powderize and repelletize
(e) Heat pellet in inert atmosphere at a rate of 2° C./minute to 850° C. Dwell for 8 hours at 850° C.
(f) Cool to room temperature at a rate of 2°/minute in argon.
(e) Powderize This reaction is able to be conducted at a temperature in a range of about 700° C. to about 950° C. in argon as shown, and also under other inert atmospheres such as nitrogen or vacuum. A reaction temperature greater than about 670° C. ensures $C \rightarrow CO$ reaction is primarily carried out.

Characterization of Active Materials and Formation and Testing of Cells

Referring to FIG. 1, the final product $LiFePO_4$, prepared from $Fe_2O_3$ metal compound per Reaction 1(b), appeared brown/black in color. This olivine material product included carbon that remained after reaction. Its CuKα x-ray diffraction pattern contained all of the peaks expected for this material as shown in FIG. 1. The pattern evident in FIG. 1 is consistent with the single phase olivine phosphate, $LiFePO_4$. This is evidenced by the position of the peaks in terms of the scattering angle 2θ (theta), x axis. The x-ray pattern showed no peaks due to the presence of precursor oxides indicating that the solid state reaction is essentially entirely completed. Here the space group SG= pnma (62) and the lattice parameters from XRD refinement are consistent with the olivine structure. The values are a=10.2883 Å (0.0020), b=5.9759 (0.0037), c=4.6717 Å (0.0012) 0.0072, cell volume=287.2264 Å³ (0.0685). Density, ρ=3.605 g/cc, zero=0.452 (0.003). Peak at full width half maximum, PFWHM=0.21. Crystallite size from XRD data=704 Å.

The x-ray pattern demonstrates that the product of the invention was indeed the nominal formula $LiFePO_4$. The term "nominal formula" refers to the fact that the relative proportion of atomic species may vary slightly on the order of 2 percent to 5 percent, or more typically, 1 percent to 3 percent, and that some portion of P may be substituted by Si, S or As; and some portion of O may be substituted by halogen, preferably F.

The $LiFePO_4$, prepared as described immediately above, was tested in an electrochemical cell. The positive electrode was prepared as described above, using 19.0 mg of active material. The positive electrode contained, on a weight % basis, 85% active material, 10% carbon black, and 5% EPDM. The negative electrode was metallic lithium. The electrolyte was a 2:1 weight ratio mixture of ethylene carbonate and dimethyl carbonate within which was dissolved 1 molar $LiPF_6$. The cells were cycled between about 2.5 and about 4.0 volts with performance as shown in FIGS. 2 and 3.

Figure 2:
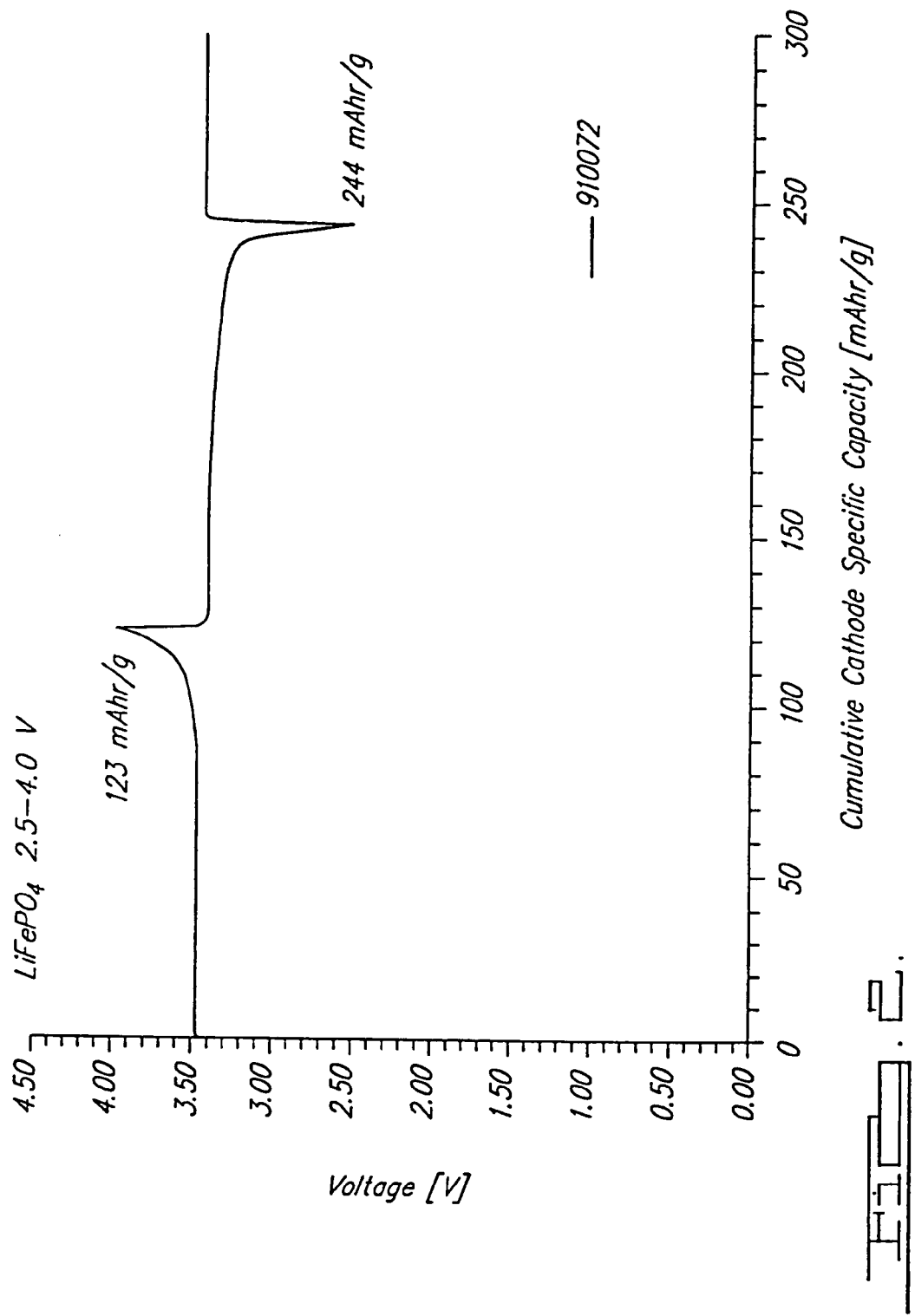
FIG. 2 is a voltage/capacity plot of LiFePO$_4$-containing cathode cycled with a lithium metal anode using constant current cycling at ±0.2 milliamps per square centimeter in a range of 2.5 to 4.0 volts at a temperature of about 23° C. The cathode contained 19.0 mg of the LiFePO$_4$ active material, prepared by the method of the invention. The electrolyte comprised ethylene carbonate (EC) and dimethyl carbonate (DMC) in a weight ratio of 2:1 and included a 1 molar concentration of LiPF$_6$ salt. The lithium-metal-phosphate-containing electrode and the lithium metal counter electrode are maintained spaced apart by a glass fiber separator which is interpenetrated by the solvent and the salt.

FIG. 2 shows the results of the first constant current cycling at 0.2 milliamps per square centimeter between about 2.5 and 4.0 volts based upon about 19 milligrams of the $LiFePO_4$ active material in the cathode (positive electrode). In an as prepared, as assembled, initial condition, the positive electrode active material is $LiFePO_4$. The lithium is extracted from the $LiFePO_4$ during charging of the cell. When fully charged, about 0.72 unit of lithium had been removed per formula unit. Consequently, the positive electrode active material corresponds to $Li_{1-x}FePO_4$ where x appears to be equal to about 0.72, when the cathode material is at 4.0 volts versus $Li/Li^+$. The extraction represents approximately 123 milliamp hours per gram corresponding to about 2.3 milliamp hours based on 19 milligrams active material. Next, the cell is discharged whereupon a quantity of lithium is re-inserted into the LiFePO$_4$. The re-insertion corresponds to approximately 121 milliamp hours per gram proportional to the insertion of essentially all of the lithium. The bottom of the curve corresponds to approximately 2.5 volts. The total cumulative capacity demonstrated during the entire extraction-insertion cycle is 244 mAh/g.

Figure 3:
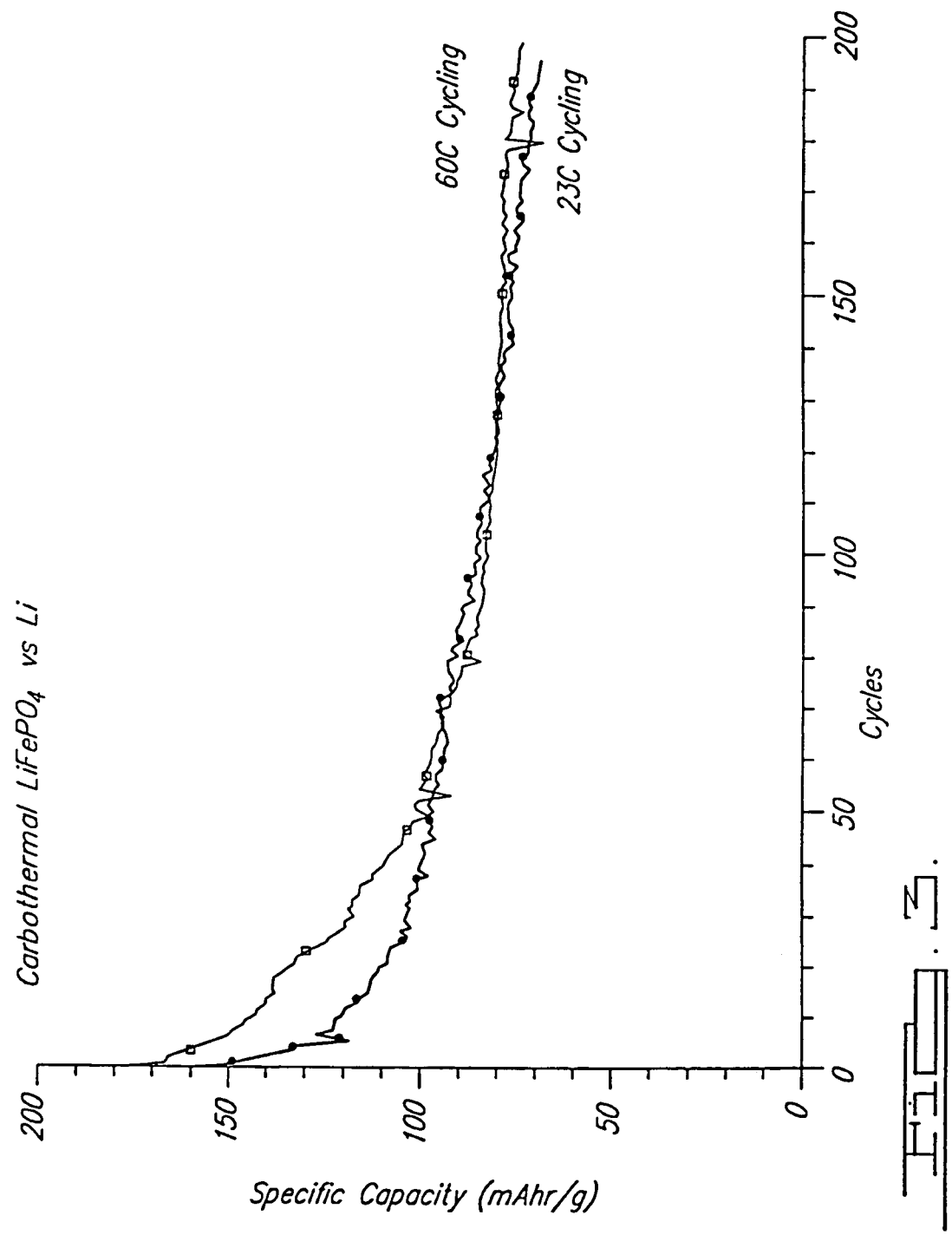
FIG. 3 shows multiple constant current cycling of LiFePO$_4$ active material cycled with a lithium metal anode using the electrolyte as described in connection with FIG. 2 and cycled, charge and discharge at ±0.2 milliamps per square centimeter, 2.5 to 4.0 volts at two different temperature conditions, 23° C. and 60° C.

FIG. 3 presents data obtained by multiple constant current cycling at 0.2 milliamp hours per square centimeter of the LiFePO$_4$ versus lithium metal counter electrode between 2.5 and 4.0 volts. Data is shown for two temperatures, 23° C. and 60° C. FIG. 3 shows the excellent rechargeability of the LiFePO$_4$ cell, and also shows good cycling and capacity of the cell. The performance shown after about 190 to 200 cycles is good and shows that electrode formulation is very desirable.

Figure 4:
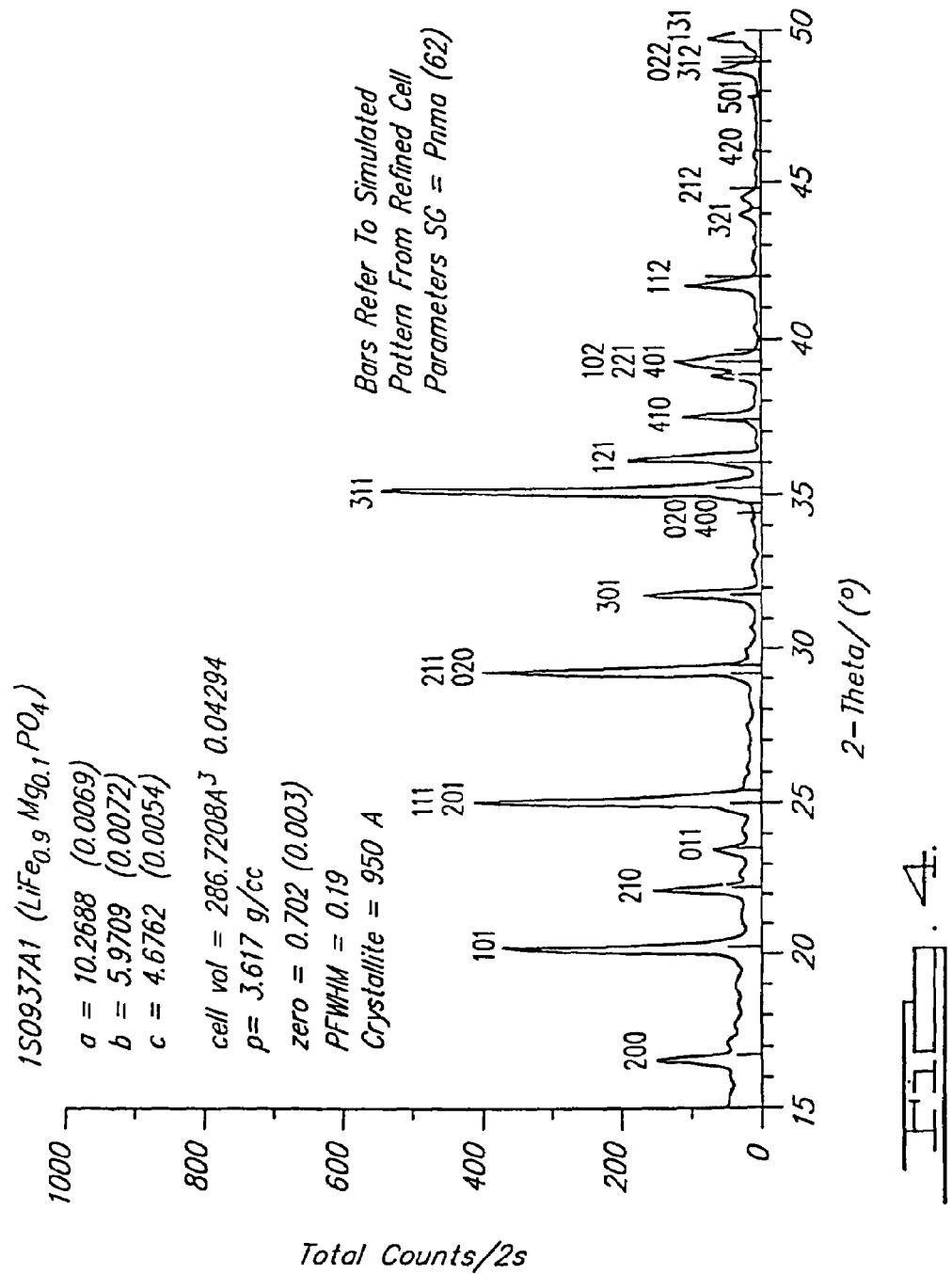
FIG. 4 shows the results of an x-ray diffraction analysis, of the LiFe$_{0.9}$Mg$_{0.1}$PO$_4$ prepared according to the invention, using CuKα radiation, λ=1.5405 Å. Bars refer to simulated pattern from refined cell parameters SG=Pnma (62). The values are a=10.2688 Å (0.0069), b=5.9709 Å (0.0072), c=4.6762 Å (0.0054), cell volume=286.7208 Å (0.04294), p=3.617 g/cc, zero=0.702 (0.003), PFWHM=0.01, and crystallite=950 Å.

Referring to FIG. 4, there is shown data for the final product LiFe$_{0.9}$Mg$_{0.1}$PO$_4$, prepared from the metal compounds Fe$_2$O$_3$ and Mg(OH)$_2$→Mg(OH)$_2$, per Reaction 2(b). Its CuKα x-ray diffraction pattern contained all of the peaks expected for this material as shown in FIG. 4. The pattern evident in FIG. 4 is consistent with the single phase olivine phosphate compound, LiFe$_{0.9}$Mg$_{0.1}$PO$_4$. This is evidenced by the position of the peaks in terms of the scattering angle 2 θ (theta), x axis. The x-ray pattern showed no peaks due to the presence of precursor oxides indicating that the solid state reaction is essentially entirely completed. Here the space group SG=Pnma (62) and the lattice parameters from XRD refinement are consistent with the olivine structure. The values are a=10.2688 Å (0.0069), b=5.9709 Å (0.0072), c=4.6762 Å (0.0054), cell volume=286.7208 Å (0.04294), p=3.617 g/cc, zero=0.702 (0.003), PFWHM=0.01, and crystallite=950 Å.

The x-ray pattern demonstrates that the product of the invention was indeed the nominal formula LiFe$_{0.9}$Mg$_{0.1}$PO$_4$ The term "nominal formula" refers to the fact that the relative proportion of atomic species may vary slightly on the order of 2 percent to 5 percent, or more typically, 1 percent to 3 percent, and that some substitution of P and O may be made while maintaining the basic olivine structure.

The LiFe$_{0.9}$Mg$_{0.1}$PO$_4$, prepared as described immediately above, was tested in an electrochemical cell. The positive electrode was prepared as described above, using 18.9 mg of active materials. The positive electrode, negative electrode and electrolyte were prepared as described earlier and in connection with FIG. 1. The cell was between about 2.5 and about 4.0 volts with performance as shown in FIGS. 4, 5 and 6.

Figure 5:
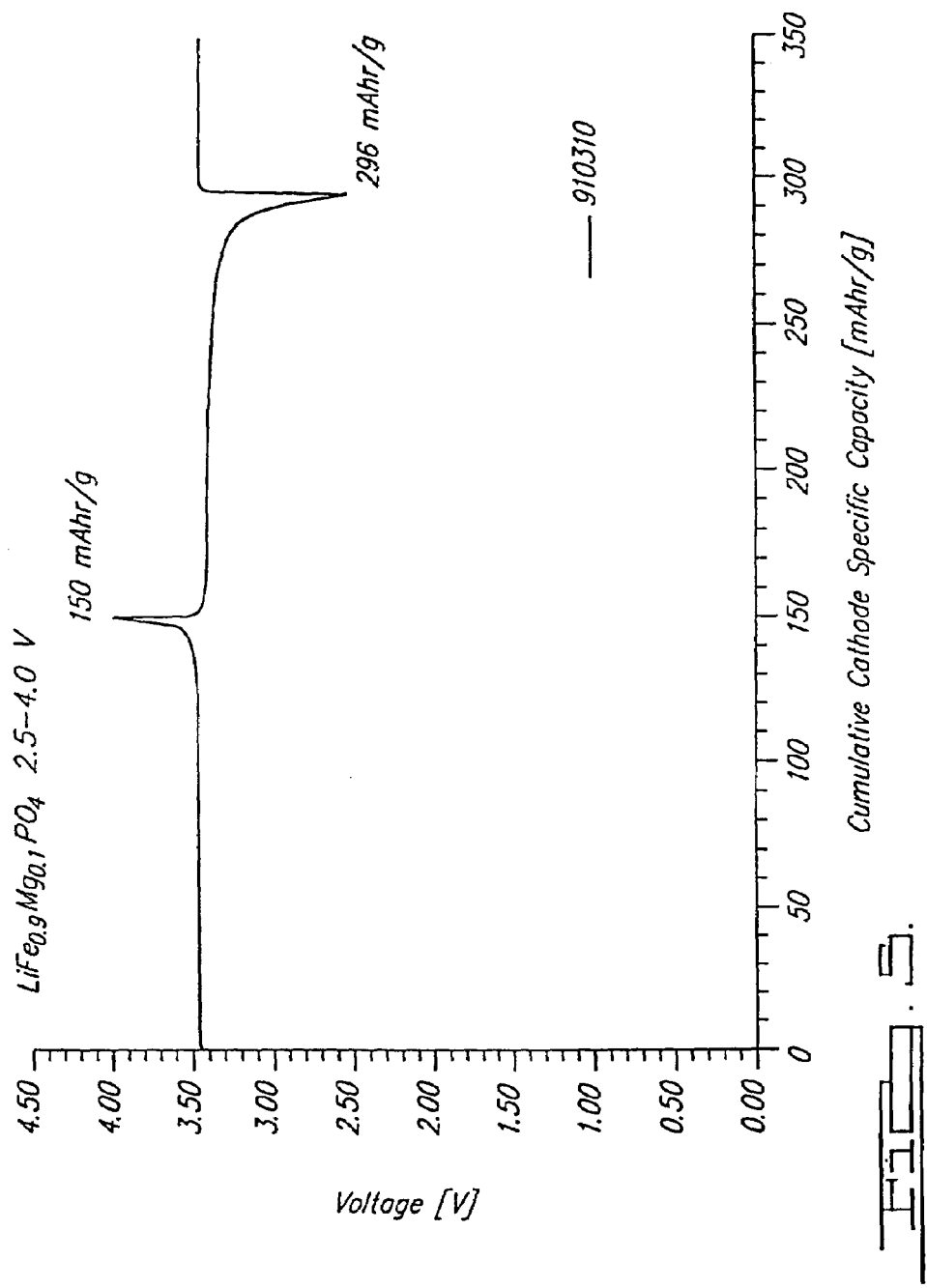
FIG. 5 is a voltage/capacity plot of LiFe$_{0.9}$Mg$_{0.1}$PO$_4$-containing cathode cycled with a lithium metal anode using constant current cycling at ±0.2 milliamps per square centimeter in a range of 2.5 to 4.0 volts. Other conditions are as described earlier with respect to FIG. 2. The cathode contained 18.9 mg of the LiFe$_{0.9}$Mg$_{0.1}$PO$_4$ active material prepared by the method of the invention.

FIG. 5 shows the results of the first constant current cycling at 0.2 milliamps per square centimeter between about 2.5 and 4.0 volts based upon about 18.9 milligrams of the LiFe$_{0.9}$Mg$_{0.1}$PO$_4$ active material in the cathode (positive electrode). In an as prepared, as assembled, initial condition, the positive electrode active material is LiFe$_{0.9}$Mg$_{0.1}$PO$_4$. The lithium is extracted from the LiFe$_{0.9}$Mg$_{0.1}$PO$_4$ during charging of the cell. When fully charged, about 0.87 units of lithium have been removed per formula unit. Consequently, the positive electrode active material corresponds to Li$_{1-x}$Fe$_{0.9}$Mg$_{0.1}$PO$_4$ where x appears to be equal to about 0.87, when the cathode material is at 4.0 volts versus Li/Li$^+$. The extraction represents approximately 150 milliamp hours per gram corresponding to about 2.8 milliamp hours based on 18.9 milligrams active material. Next, the cell is discharged whereupon a quantity of lithium is re-inserted into the LiFe$_{0.9}$Mg$_{0.1}$PO$_4$. The re-insertion corresponds to approximately 146 milliamp hours per gram proportional to the insertion of essentially all of the lithium. The bottom of the curve corresponds to approximately 2.5 volts. The total cumulative specific capacity over the entire cycle is 296 mAhr/g. This material has a much better cycle profile than the LiFePO$_4$. FIG. 5 (LiFe$_{0.9}$Mg$_{0.1}$PO$_4$) shows a very well defined and sharp peak at about 150 mAh/g. In contrast, FIG. 2 (LiFePO$_4$) shows a very shallow slope leading to the peak at about 123 mAh/g. The Fe-phosphate (FIG. 2) provides 123 mAh/g compared to its theoretical capacity of 170 mAh/g. This ratio of 123/170, 72% is relatively poor compared to the Fe/Mg-phosphate. The Fe/Mg-phosphate (FIG. 5) provides 150 mAh/g compared to a theoretical capacity of 160, a ratio of 150/160 or 94%.

Figure 6:
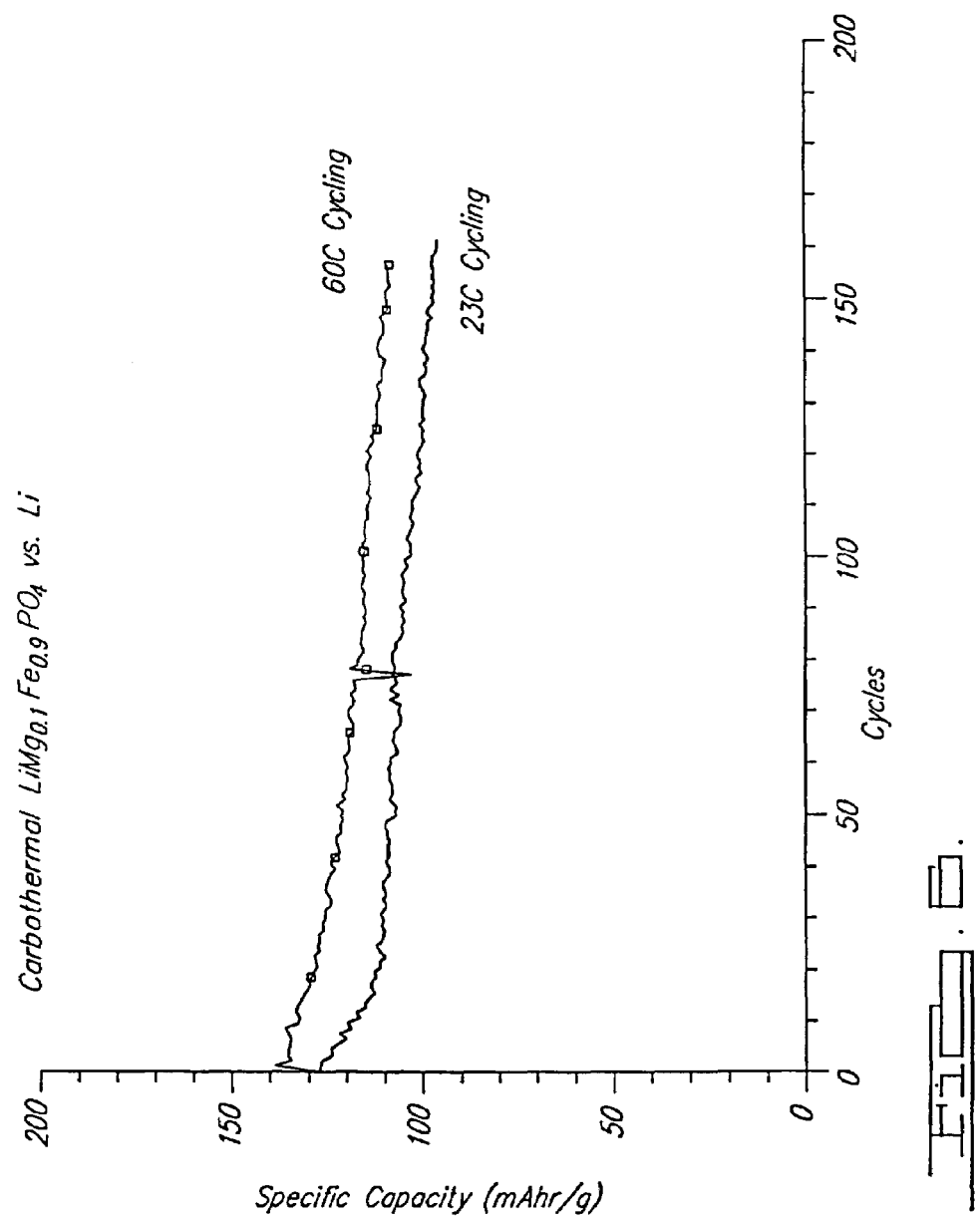
FIG. 6 shows multiple constant current cycling of LiFe$_{0.9}$Mg$_{0.1}$PO$_4$ cycled with a lithium metal anode using the electrolyte as described in connection with FIG. 2 and cycled, charge and discharge at ±0.2 milliamps per square centimeter, 2.5 to 4.0 volts at two different temperature conditions, 23° C. and 60° C.

FIG. 6 presents data obtained by multiple constant current cycling at 0.2 milliamp hours per square centimeter of the LiFe$_{0.9}$Mg$_{0.1}$PO$_4$ versus lithium metal counter electrode between 2.5 and 4.0 volts. FIG. 6 shows the excellent rechargeability of the Li/LiFe$_{0.9}$Mg$_{0.1}$PO$_4$ cell, and also shows good cycling and capacity of the cell. The performance shown after about 150 to 160 cycles is very good and shows that electrode formulation LiFe$_{0.9}$Mg$_{0.1}$PO$_4$ performed significantly better than the LiFePO$_4$. Comparing FIG. 3 (LiFePO$_4$) to FIG. 6 (LiFe$_{0.9}$Mg$_{0.1}$PO$_4$) it can be seen that the Fe/Mg-phosphate maintains its capacity over prolonged cycling, whereas the Fe-phosphate capacity fades significantly.

Figure 7:
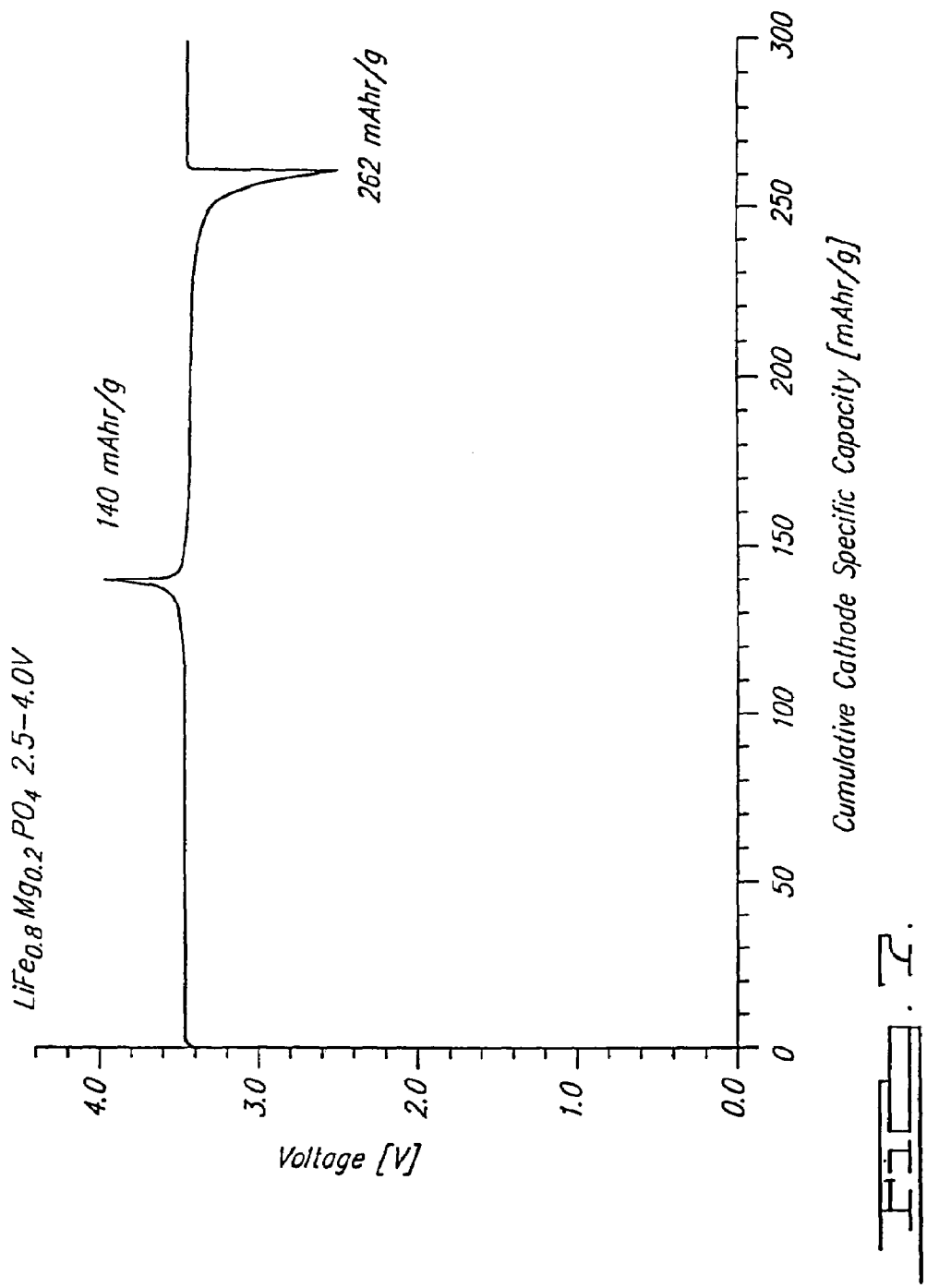
FIG. 7 is a voltage/capacity plot of LiFe$_{0.8}$Mg$_{0.2}$PO$_4$-containing cathode cycled with a lithium metal anode using constant current cycling at ±0.2 milliamps per square centimeter in a range of 2.5 to 4.0 volts at 23° C. Other conditions are as described earlier with respect to FIG. 2. The cathode contained 16 mg of the LiFe$_{0.8}$Mg$_{0.2}$PO$_4$ active material prepared by the method of the invention.

FIG. 7 shows the results of the first constant current cycling at 0.2 milliamps per square centimeter between about 2.5 and 4.0 volts based upon about 16 milligrams of the LiFe$_{0.8}$Mg$_{0.2}$PO$_4$ active material in the cathode (positive electrode). In an as prepared, as assembled, initial condition, the positive electrode active material is LiFe$_{0.8}$Mg$_{0.2}$PO$_4$. The lithium is extracted from the LiFe$_{0.8}$Mg$_{0.2}$PO$_4$ during charging of the cell. When fully charged, about 0.79 units of lithium have been removed per formula unit. Consequently, the positive electrode active material corresponds to LiFe$_{0.8}$Mg$_{0.2}$PO$_4$ where x appears to be equal to about 0.79, when the cathode material is at 4.0 volts versus Li/Li$^+$. The extraction approximately 135 milliamp hours per gram corresponding to about 2.2 milliamp hours based on 16 milligrams active material. Next, the cell is discharged whereupon a quantity of lithium is re-inserted into the LiFe$_{0.8}$Mg$_{0.2}$PO$_4$. The re-insertion corresponds to approximately 122 milliamp hours per gram proportional to the insertion of essentially all of the lithium. The bottom of the curve corresponds to approximately 2.5 volts. The total cumulative specific capacity over the entire cycle is 262 mAhr/g.

Figure 8:
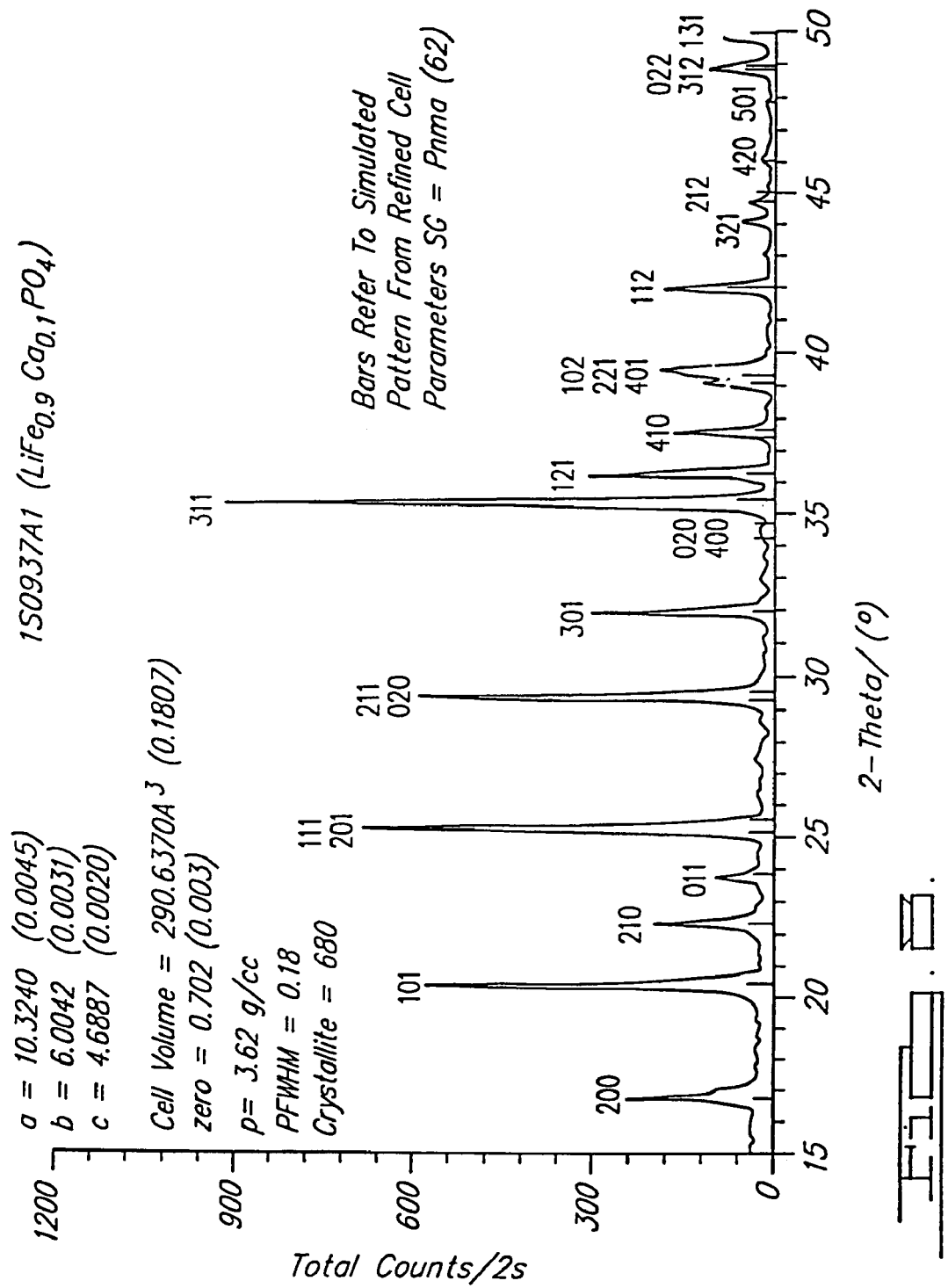
FIG. 8 shows the results of an x-ray diffraction analysis, of the LiFe$_{0.9}$Ca$_{0.1}$PO$_4$ prepared according to the invention, using CuKα radiation, λ=1.5405 Å. Bars refer to simulated pattern from refined cell parameters SG=Pnma (62). The values are a=10.3240 Å (0.0045), b=6.0042 Å (0.0031), c=4.6887 Å (0.0020), cell volume=290.6370 Å (0.1807), zero=0.702 (0.003), p=3.62 g/cc, PFWHM=0.18, and crystallite=680 Å.

Referring to FIG. 8, there is shown data for the final product LiFe$_{0.9}$Ca$_{0.1}$PO$_4$, prepared from Fe$_2$O$_3$ and Ca(OH)$_2$ by Reaction 3. Its CuKα x-ray diffraction pattern contained all of the peaks expected for this material as shown in FIG. 8. The pattern evident in FIG. 8 is consistent with the single phase olivine phosphate compound, LiFe$_{0.9}$Ca$_{0.1}$PO$_4$. This is evidenced by the position of the peaks in terms of the scattering angle 2θ (theta), x axis. The x-ray pattern showed no peaks due to the presence of precursor oxides indicating that the solid state reaction is essentially entirely completed. Here the space group SG=Pnma (62) and the lattice parameters from XRD refinement are consistent with olivine. The values are a=10.3240 Å (0.0045), b=6.0042 Å (0.0031), c=4.6887 Å (0.0020), cell volume=290.6370 Å (0.1807), zero=0.702 (0.003), p=3.62 g/cc, PFWHM=0.18, and crystallite=680 Å. The x-ray pattern demonstrates that the product of the invention was indeed the nominal formula LiFe$_{0.9}$Ca$_{0.1}$PO$_4$.

Figure 9:
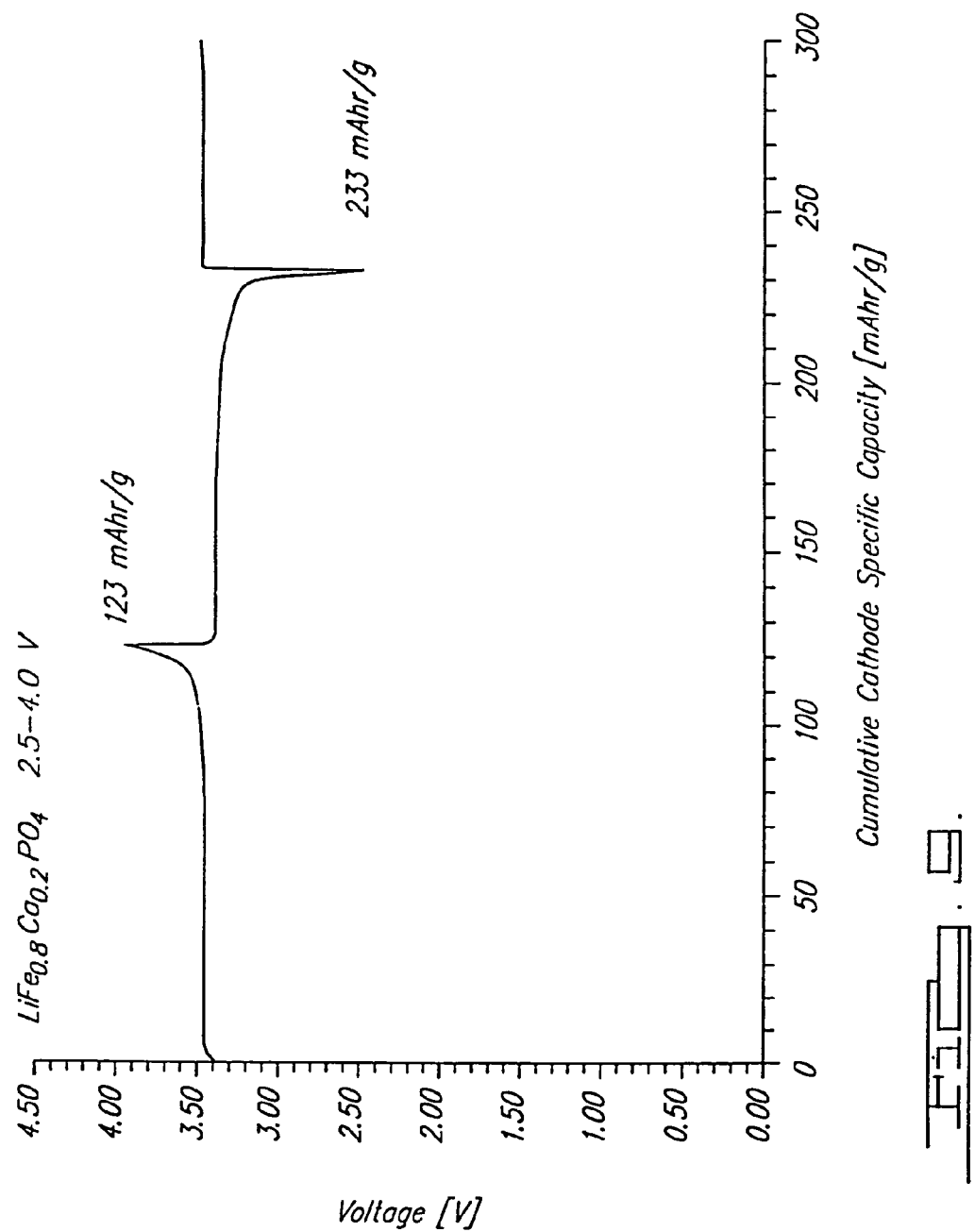
FIG. 9 is a voltage/capacity plot of LiFe$_{0.8}$Ca$_{0.2}$PO$_4$-containing cathode cycled with a lithium metal anode using constant current cycling at ±0.2 milliamps per square centimeter in a range of 2.5 to 4.0 volts at 23°. Other conditions are as described earlier with respect to FIG. 2. The cathode contained 18.5 mg of the LiFe$_{0.8}$Ca$_{0.2}$PO$_4$ active material prepared by the method of the invention.

FIG. 9 shows the results of the first constant current cycling at 0.2 milliamps per square centimeter between about 2.5 and 4.0 volts based upon about 18.5 milligrams of the $LiFe_{0.8}Ca_{0.2}PO_4$ active material in the cathode (positive electrode). In an as prepared, as assembled, initial condition, the positive electrode active material is $LiFe_{0.8}Ca_{0.2}PO_4$. The lithium is extracted from the $LiFe_{0.8}Ca_{0.2}PO_4$ during charging of the cell. When fully charged, about 0.71 units of lithium have been removed per formula unit. Consequently, the positive electrode active material corresponds to $LiFe_{0.8}Ca_{0.2}PO_4$ where x appears to be equal to about 0.71, when the cathode material is at 4.0 volts versus $Li/Li^+$. The extraction represents approximately 123 milliamp hours per gram corresponding to about 2.3 milliamp hours based on 18.5 milligrams active material. Next, the cell is discharged whereupon a quantity of lithium is re-inserted into the $LiFe_{0.8}Ca_{0.2}PO_4$. The re-insertion corresponds to approximately 110 milliamp hours per gram proportional to the insertion of nearly all of the lithium. The bottom of the curve corresponds to approximately 2.5 volts. The total specific cumulative capacity over the entire cycle is 233 mAhr/g.

Figure 10:
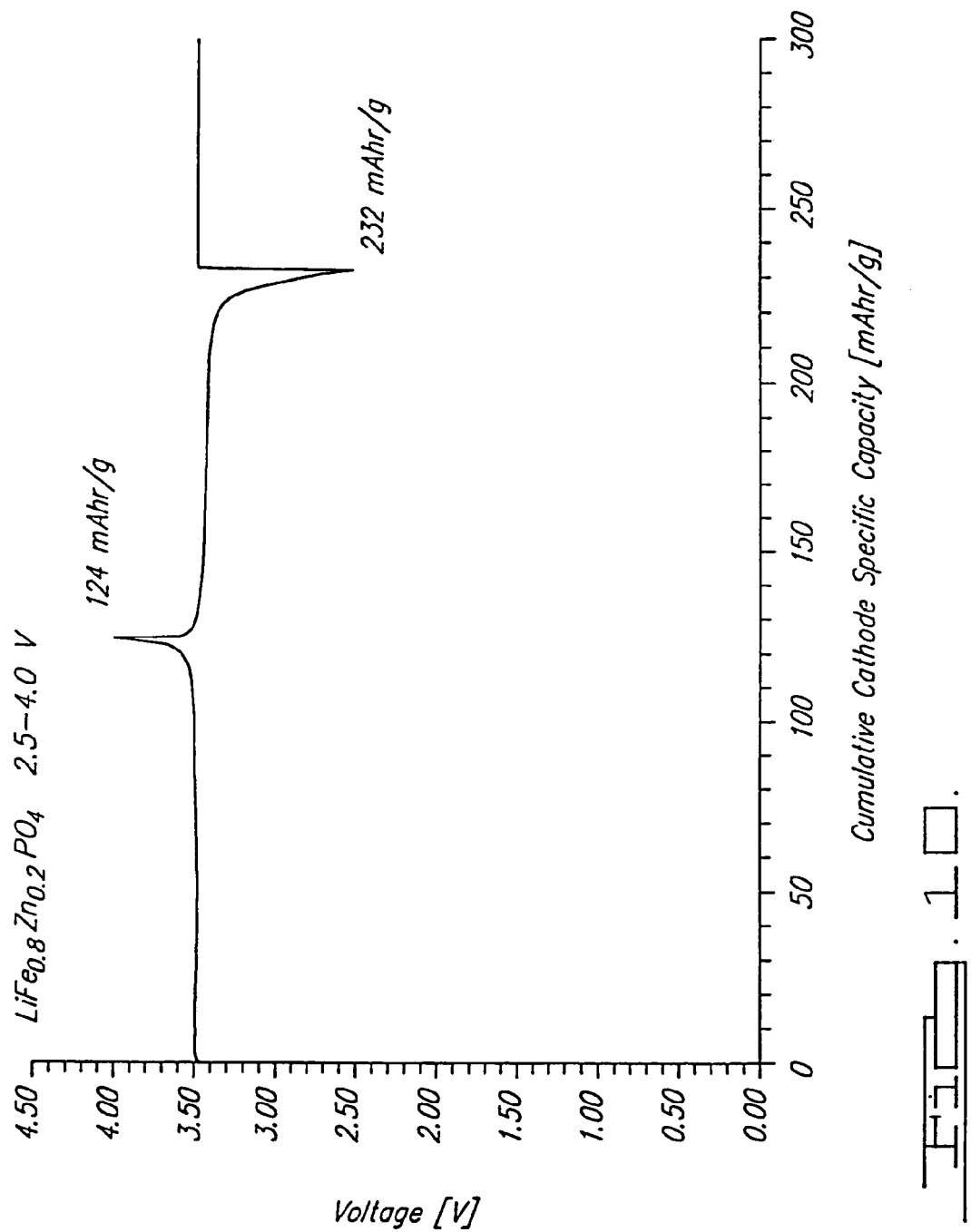
FIG. 10 is a voltage/capacity plot of LiFe$_{0.8}$Zn$_{0.2}$PO$_4$-containing cathode cycled with a lithium metal anode using constant current cycling at ±0.2 milliamps per square centimeter in a range of 2.5 to 4.0 volts at 23° C. Other conditions are as described earlier with respect to FIG. 2. The cathode contained 18.9 mg of the LiFe$_{0.8}$Zn$_{0.2}$PO$_4$ active material prepared by the method of the invention.

FIG. 10 shows the results of the first constant current cycling at 0.2 milliamps per square centimeter between about 2.5 and 4.0 volts based upon about 18.9 milligrams of the $LiFe_{0.8}Zn_{0.2}PO_4$ olivine active material in the cathode (positive electrode). In an as prepared, as assembled, initial condition, the positive electrode active material is $LiFe_{0.8}Zn_{0.2}PO_4$, prepared from $Fe_2O_3$ and $Zn_3(PO_4)_2$ by Reaction 4. The lithium is extracted from the $LiFe_{0.8}Zn_{0.2}PO_4$ during charging of the cell. When fully charged, about 0.74 units of lithium have been removed per formula unit. Consequently, the positive electrode active material corresponds to $Li_{1-x}Fe0.8Zn0.2PO4$ where x appears to be equal to about 0.74, when the cathode material is at 4.0 volts versus $Li/Li^+$. The extraction represents approximately 124 milliamp hours per gram corresponding to about 2.3 milliamp hours based on 18.9 milligrams active material. Next, the cell is discharged whereupon a quantity of lithium is re-inserted into the $LiFe_{0.8}Zn_{0.2}PO_4$. The re-insertion corresponds to approximately 108 milliamp hours per gram proportional to the insertion of nearly all of the lithium. The bottom of the curve corresponds to approximately 2.5 volts.

Figure 11:
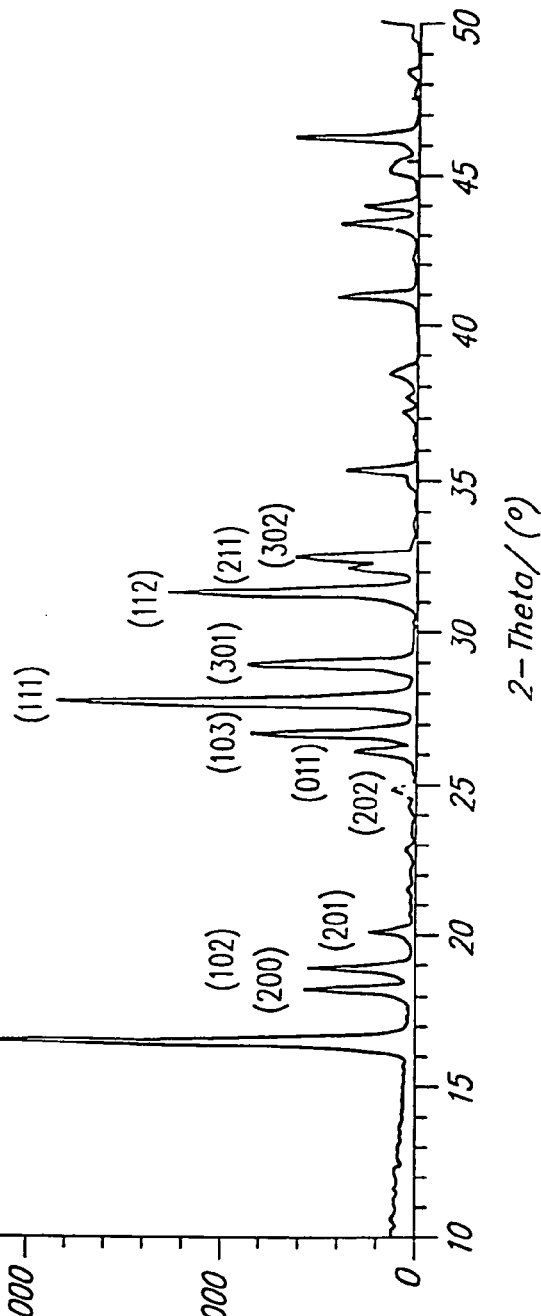
FIG. 11 shows the results of an x-ray diffraction analysis of the gamma-Li$_x$V$_2$O$_5$(x=1, gamma LiV$_2$O$_5$) prepared according to the invention using CuKα radiation λ=1.5405 Å. The values are a=9.687 Å (1), b=3.603 Å (2), and c=10.677 Å (3); phase type is gamma-$Li_xV_2O_5$(x=1); symmetry is orthorhombic; and space group is Pnma.

Referring to FIG. 11, the final product $LiV_2O_5$, prepared by Reaction 5, appeared black in color. Its CuKα x-ray diffraction pattern contained all of the peaks expected for this material as shown in FIG. 11. The pattern evident in FIG. 11 is consistent with a single oxide compound gamma-$LiV_2O_5$ This is evidenced by the position of the peaks in terms of the scattering angle 2 θ (theta), x axis. The x-ray pattern showed no peaks due to the presence of precursor oxides indicating that the solid state reaction is essentially entirely completed.

The x-ray pattern demonstrates that the product of the invention was indeed the nominal formula gamma-$LiV_2O_5$. The term "nominal formula" refers to the fact that the relative proportion of atomic species may vary slightly on the order of 2 percent to 5 percent, or more typically, 1 percent to 3 percent.

The $LiV_2O_5$ prepared as described immediately above, was tested in an electrochemical cell. The cell was prepared as described above and cycled with performance as shown in FIGS. 12 and 13.

Figure 12:
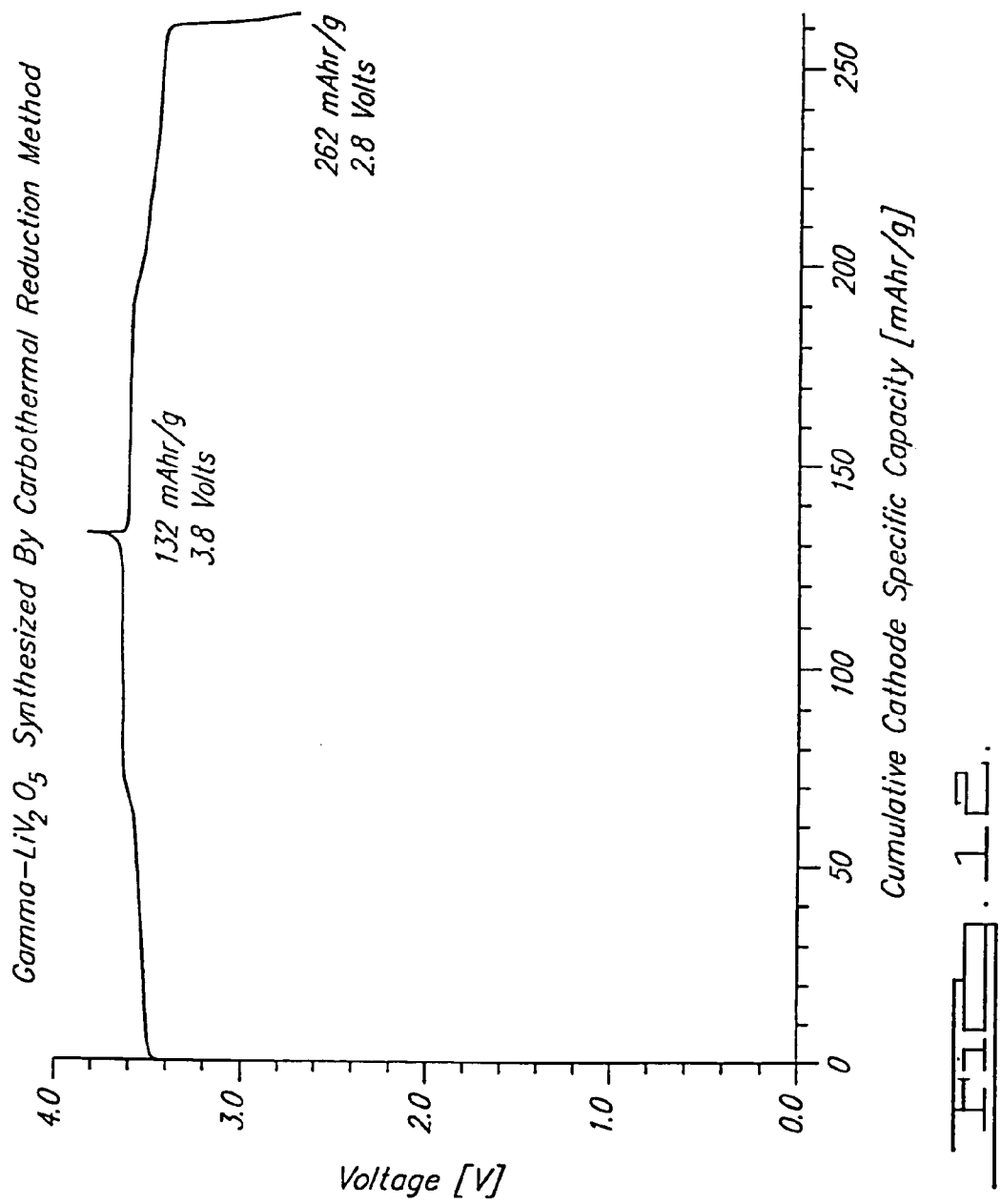
FIG. 12 is a voltage/capacity plot of gamma-$LiV_2O_5$-containing cathode cycled with a lithium metal anode using constant current cycling at ±0.2 milliamps per square centimeter in a range of 2.5 to 3.8 volts at 23° C. Other conditions are as described earlier with respect to FIG. 2. The cathode contained 21 mg of the gamma-$LiV_2O_5$ active material prepared by the method of the invention.

FIG. 12 shows the results of the first constant current cycling at 0.2 milliamps per square centimeter between about 2.8 and 3.8 volts based upon about 15.0 milligrams of the $LiV_2O_5$ active material in the cathode (positive electrode). In an as prepared, as assembled, initial condition, the positive electrode active material is $LiV_2O_5$. The lithium is extracted from the $LiV_2O_5$ during charging of the cell. When fully charged, about 0.93 unit of lithium had been removed per formula unit. Consequently, the positive electrode active material corresponds to $Li_{1-x}$-$V_2O_5$ where x appears to be equal to about 0.93, when the cathode material is at 3.8 volts versus $Li/Li^+$. The extraction represents approximately 132 milliamp hours per gram corresponding to about 2.0 milliamp hours based on 15.0 milligrams active material. Next, the cell is discharged whereupon a quantity of lithium is re-inserted into the $LiV_2O_5$. The re-insertion corresponds to approximately 130 milliamp hours per gram proportional to the insertion of essentially all of the lithium. The bottom of the curve corresponds to approximately 2.8 volts.

Figure 13:
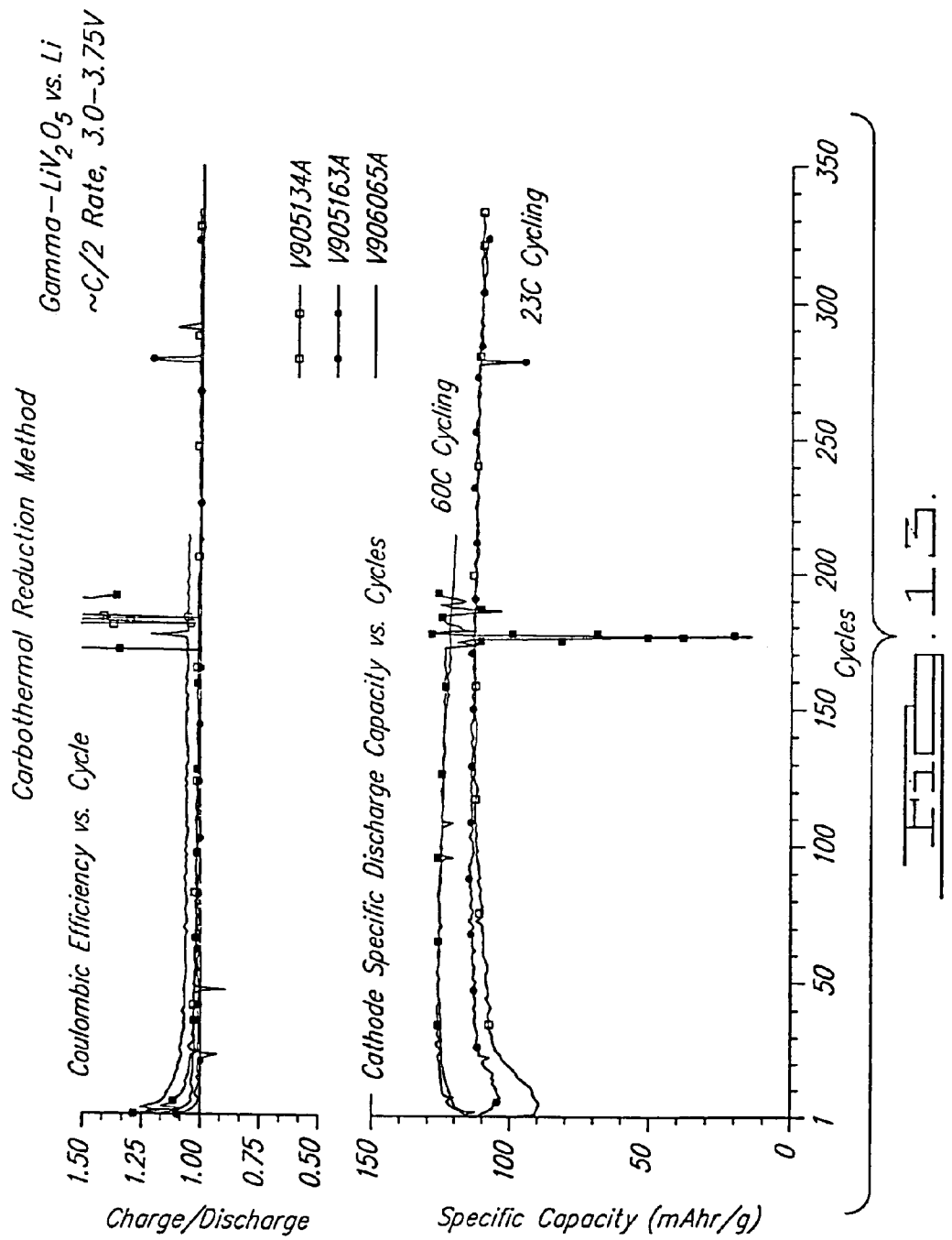
FIG. 13 is a two-part graph based on multiple constant current cycling of gamma-$LiV_2O_5$ cycled with a lithium metal anode using the electrolyte as described in connection with FIG. 2 and cycled, charge and discharge at ±0.2 milliamps per square centimeter, 2.5 to 3.8 volts. In the two-part graph.

FIG. 13 presents data obtained by multiple constant current cycling at 0.4 milliamp hours per square centimeter (C/2 rate)of the $LiV_2O_5$ versus lithium metal counter electrode between 3.0 and 3.75 volts. Data for two temperature conditions are shown, 23° C. and 60° C. FIG. 13 is a two part graph with FIG. 13A showing the excellent rechargeability of the $LiV_2O_5$. FIG. 13B shows good cycling and capacity of the cell. The performance shown up to about 300 cycles is good.

Figure 14:
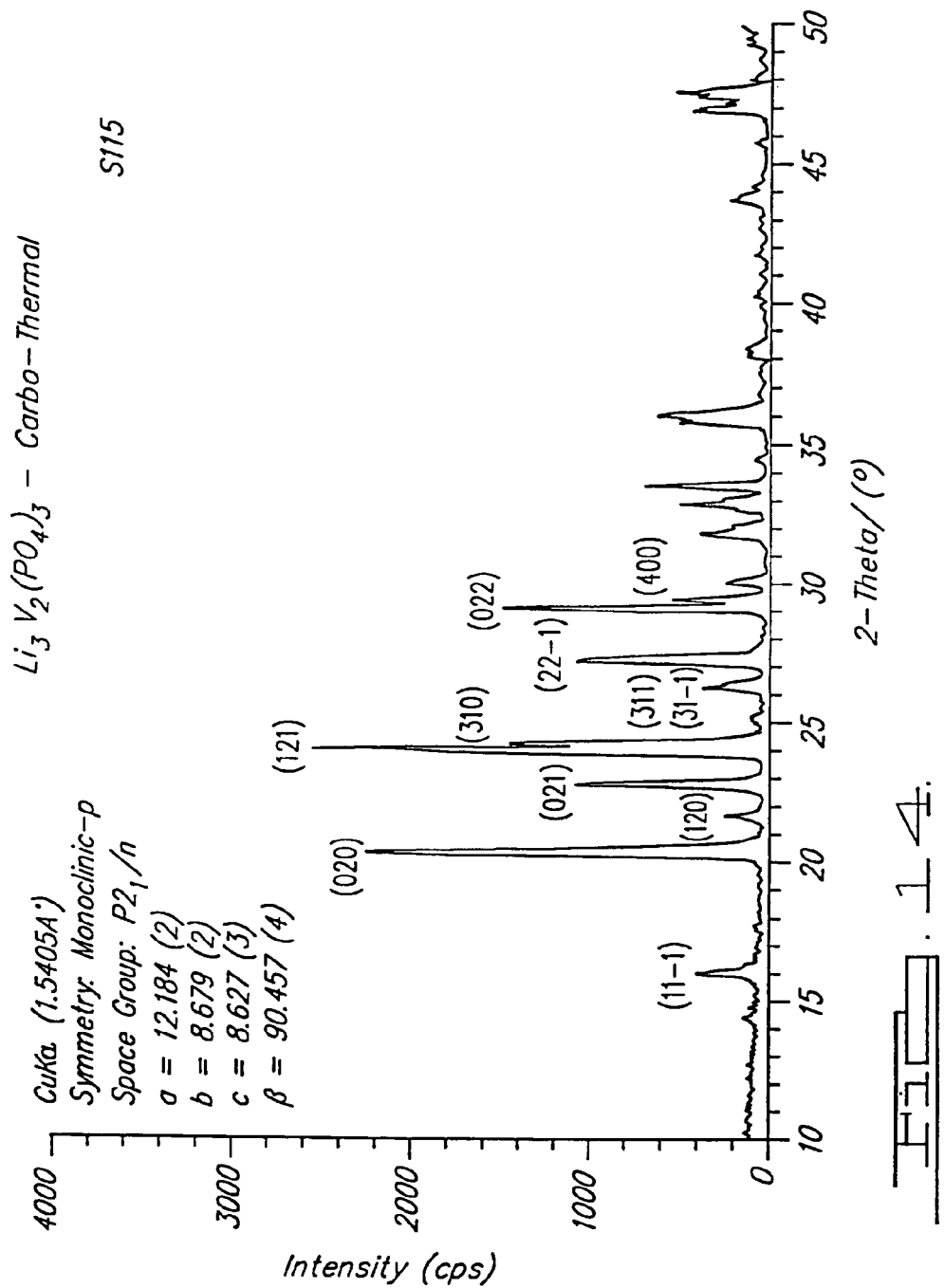
FIG. 14 shows the results of an x-ray diffraction analysis of the $Li_3V_2(PO_4)_3$ prepared according to the invention. The analysis is based on CuKα radiation, λ=1.5405 Å. The values are a=12.184 Å (2), b=8.679 Å (2), c=8.627 Å (3), and β=90.457° (4).

Referring to FIG. 14, the final product $Li_3V_2(PO_4)_3$, prepared by Reaction 6, appeared green/black in color. Its CuKα x-ray diffraction pattern contained all of the peaks expected for this material as shown in FIG. 14. The pattern evident in FIG. 14 is consistent with a single phosphate compound $Li_3V_2(PO_4)_3$ of the monoclinic, Nasicon phase. This is evidenced by the position of the peaks in terms of the scattering angle 2 θ (theta), x axis. The x-ray pattern showed no peaks due to the presence of precursor oxides indicating that the solid state reaction is essentially entirely completed.

The x-ray pattern demonstrates that the product of the invention was indeed the nominal formula $Li_3V_2(PO_4)_3$, The term "nominal formula" refers to the fact that the relative proportion of atomic species may vary slightly on the order of 2 percent to 5 percent, or more typically, 1 percent to 3 percent; and that substitution of P and O may occur.

Figure 16:
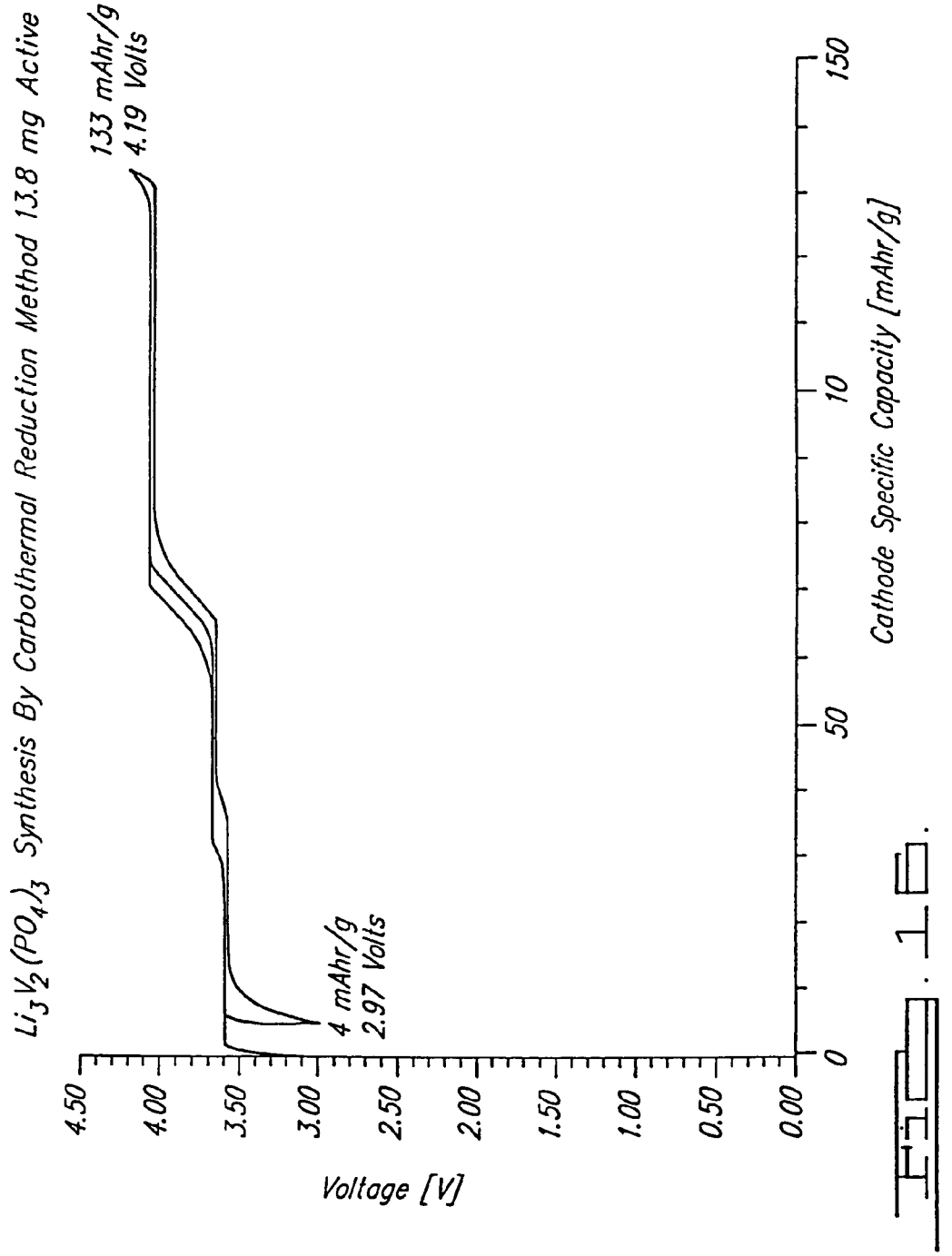
FIG. 16 is an EVS (Electrochemical Voltage Spectroscopy) voltage/capacity profile for a cell with cathode material formed by the carbothermal reduction method of the invention. The cathode material is 13.8 mg of $Li_3V_2(PO_4)_3$. The cell includes a lithium metal counter electrode in an electrolyte comprising ethylene carbonate (EC) and dimethyl carbonate (DMC) in a weight ratio of 2:1 and including a 1 molar concentration of $LiPF_6$ salt. The lithium-metal-phosphate containing electrode and the lithium metal counter electrode are maintained spaced apart by a fiberglass separator which is interpenetrated by the solvent and the salt. The conditions are ±10 mV steps, between about 3.0 and 4.2 volts, and the critical limiting current density is less than or equal to 0.1 mA/$cm^2$.
Figure 17:
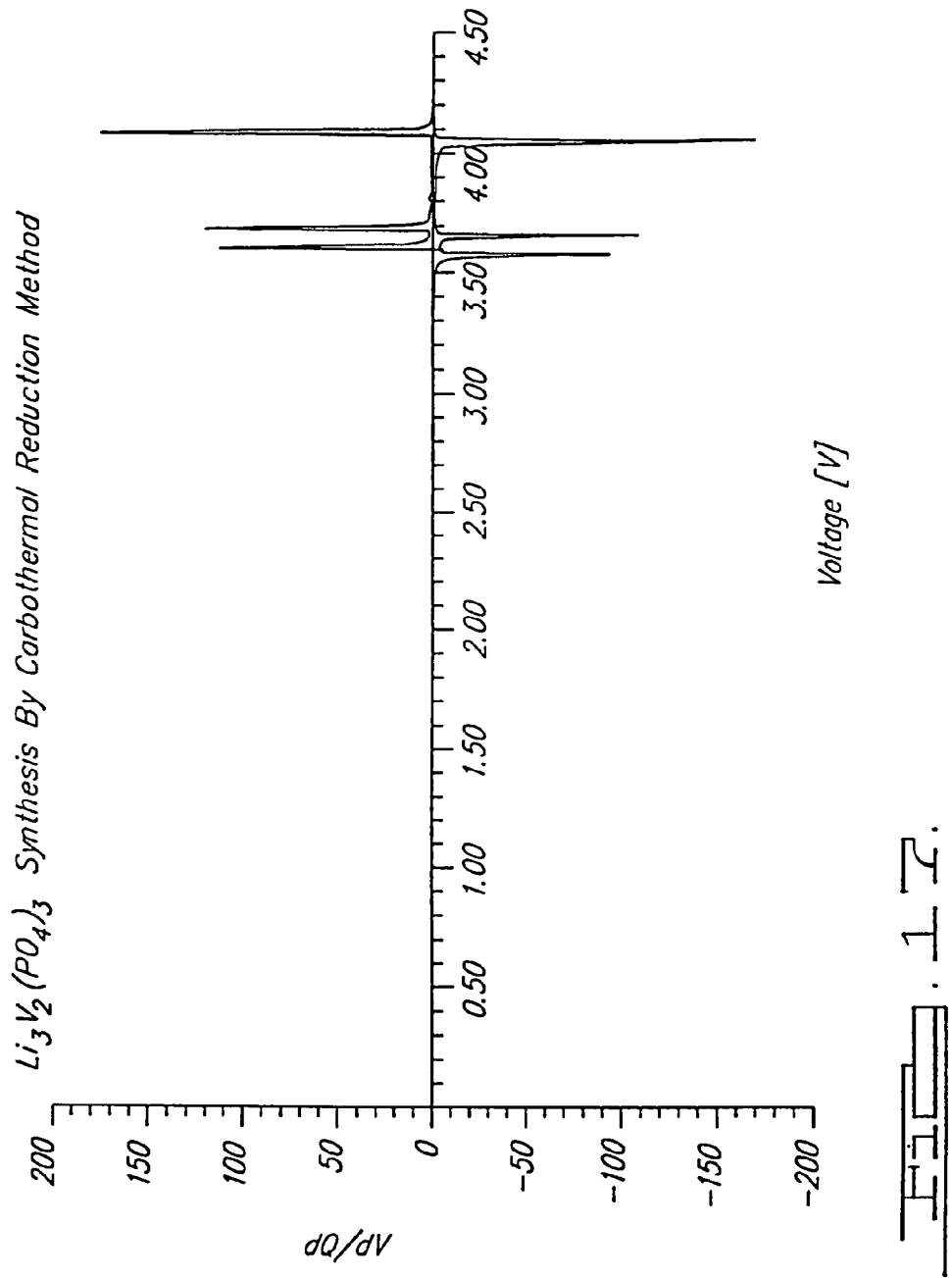
FIG. 17 is an EVS differential capacity versus voltage plot for the cell as described in connection with FIG. 16.

The $Li_3V_2(PO_4)_3$ prepared as described immediately above, was tested in an electrochemical cell. The cell was prepared as described above, using 13.8 mg of active material. The cell was prepared as described above and cycled between about 3.0 and about 4.2 volts using the EVS technique with performance as shown in FIGS. 16 and 17. FIG. 16 shows specific capacity versus electrode potential against Li. FIG. 17 shows differential capacity versus electrode potential against Li.

Figure 15:
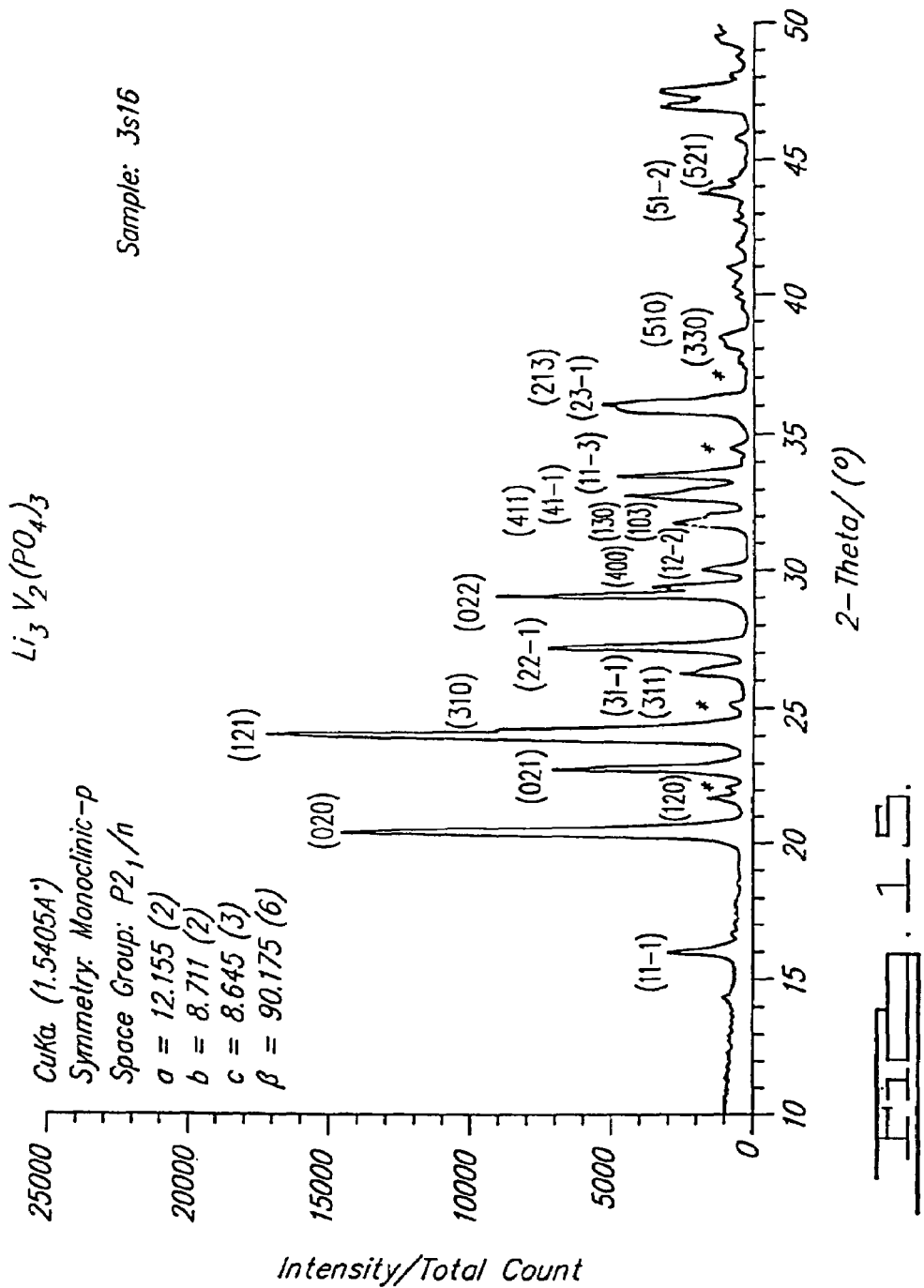
FIG. 15 shows the results of an x-ray diffraction analysis of $Li_3V_2(PO_4)_3$ prepared according to a method described in U.S. Pat. No. 5,871,866. The analysis is based on CuKα radiation, λ=1.5405 Å. The values are a=12.155 Å (2), b=8.711 Å (2), c=8.645 Å (3); the angle beta is 90.175 (6); symmetry is Monoclinic; and space group is $P2_1/n$.

A comparative method was used to form $Li_3V_2(PO_4)_3$. Such method was reaction without carbon and under $H_2$-reducing gas as described in U.S. Pat. No. 5,871,866. The final product, prepared as per U.S. Pat. No. 5,871,866, appeared green in color. Its CuKα x-ray diffraction pattern contained all of the peaks expected for this material as shown in FIG. 15. The pattern evident in FIG. 15 is consistent with a monoclinic Nasicon single phase phosphate compound $Li_3V_2(PO_4)_3$. This is evidenced by the position of the peaks in terms of the scattering angle 2 θ (theta), x axis. The x-ray pattern showed no peaks due to the presence of precursor oxides indicating that the solid state reaction is essentially entirely completed. Chemical analysis for lithium and vanadium by atomic absorption spectroscopy showed, on a percent by weight basis, 5.17 percent lithium and 26 percent vanadium. This is close to the expected result of 5.11 percent lithium and 25 percent vanadium.

The chemical analysis and x-ray patterns of FIGS. 14 and 15 demonstrate that the product of FIG. 14 was the same as that of FIG. 15. The product of FIG. 14 was prepared without the undesirable $H_2$ atmosphere and was prepared by the novel carbothermal solid state synthesis of the invention.

FIG. 16 shows a voltage profile of the test cell, based on the $Li_3V_2(PO_4)_3$ positive electrode active material made by the process of the invention and as characterized in FIG. 14. It was cycled against a lithium metal counter electrode. The data shown in FIG. 16 is based on the Electrochemical Voltage Spectroscopy (EVS) technique. Electrochemical and kinetic data were recorded using the Electrochemical Voltage Spectroscopy (EVS) technique. Such technique is known in the art as described by J. Barker in Synth, Met 28, D217 (1989); Synth. Met. 32, 43 (1989); J. Power Sources, 52, 185 (1994); and Electrochemica Acta, Vol. 40, No. 11, at 1603 (1995). FIG. 16 clearly shows and highlights the reversibility of the product. The positive electrode contained about 13.8 milligrams of the $Li_3V_2(PO_4)_3$ active material. The positive electrode showed a performance of about 133 milliamp hours per gram on the first discharge. In FIG. 16, the capacity in, and the capacity out are essentially the same, resulting in essentially no capacity loss. FIG. 17 is an EVS differential capacity plot based on FIG. 16. As can be seen from FIG. 17, the relatively symmetrical nature of peaks indicates good electrical reversibility, there are small peak separations (charge/discharge), and good correspondence between peaks above and below the zero axis. There are essentially no peaks that can be related to irreversible reactions, since all peaks above the axis (cell charge) have corresponding peaks below the axis (cell discharge), and there is essentially no separation between the peaks above and below the axis. This shows that the carbothermal method of the invention produces high quality electrode material.

Figure 18:
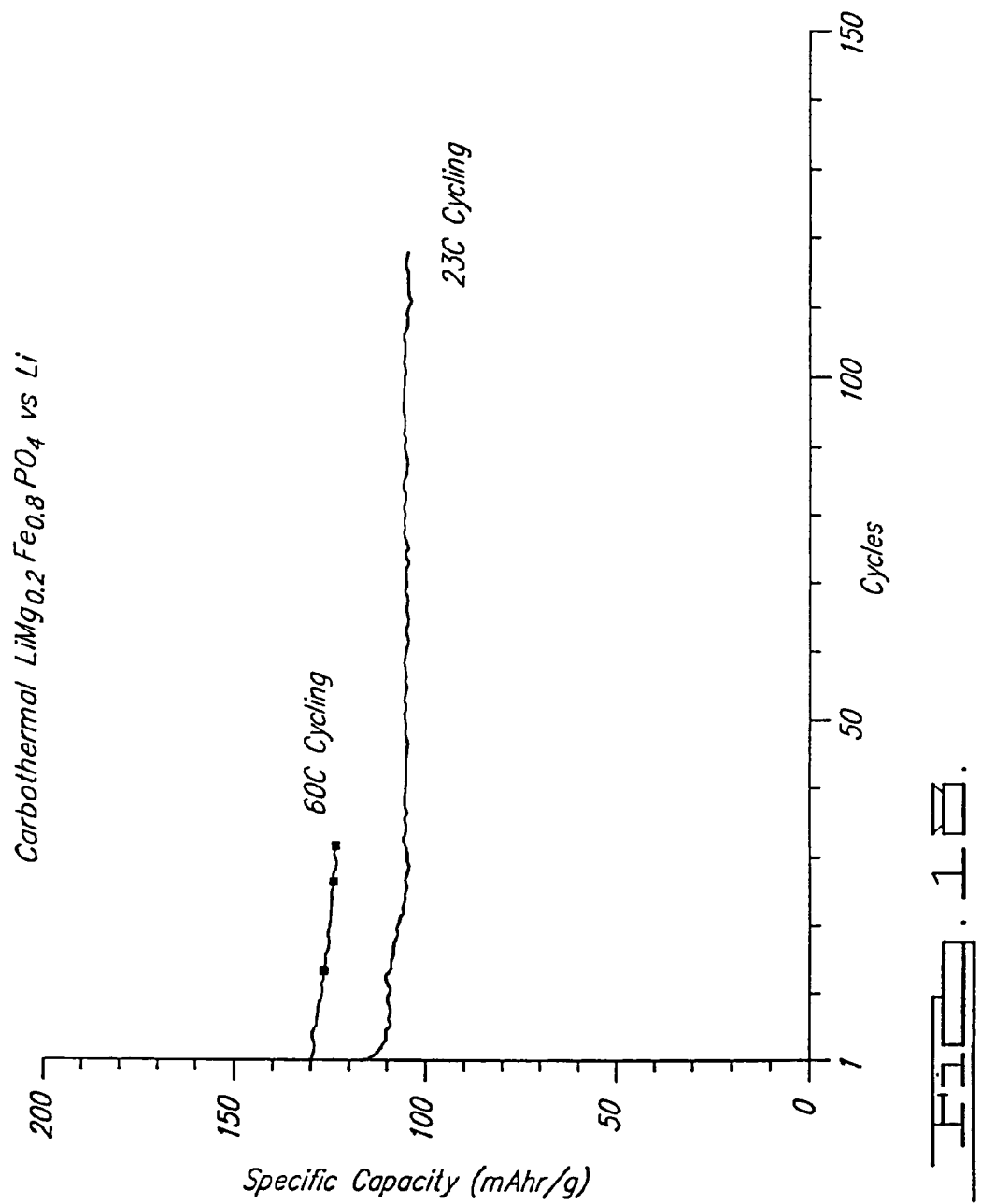
FIG. 18 shows multiple constant current cycling of $LiFe_{0.8}Mg_{0.2}PO_4$ cycled with a lithium metal anode using the electrolyte as described in connection with FIG. 2 and cycled, charge and discharge at ±0.2 milliamps per square centimeter, 2.5 to 4.0 volts at two different temperature conditions, 23° C. and 60° C.

FIG. 18 presents data obtained by multiple constant current cycling at 0.2 milliamp hours per square centimeter of the $LiFe_{0.8}Mg_{0.2}PO_4$ versus lithium metal counter electrode between 2.5 and 4.0 volts. FIG. 18 shows the excellent rechargeability of the $Li/LiFe_{0.8}Mg_{0.2}PO_4$ cell, and also shows good cycling and capacity of the cell. The performance shown after about 110 to 120 cycles at 23° C. is very good and shows that electrode formulation $LiFe_{0.8}Mg_{0.2}PO_4$ performed significantly better than the $LiFePO_4$. The cell cycling test at 60° C. was started after the 23° C. test and was ongoing. Comparing FIG. 3 ($LiFePO_4$) to FIG. 18 ($LiFe_{0.8}Mg_{0.2}PO_4$), it can be seen that the Fe/Mg-phosphate maintains its capacity over prolonged cycling, whereas the Fe-phosphate capacity fades significantly.

In addition to the above cell tests, the active materials of the invention were also cycled against insertion anodes in non-metallic, lithium ion, rocking chair cells.

The lithium mixed metal phosphate and the lithium metal oxide were used to formulate a cathode electrode. The electrode was fabricated by solvent casting a slurry of the treated, enriched lithium manganese oxide, conductive carbon, binder, plasticizer and solvent. The conductive carbon used was Super P (MMM Carbon). Kynar Flex 2801® was used as the binder and electronic grade acetone was used as a solvent. The preferred plasticizer was dibutyl phthalate (DPB). The slurry was cast onto glass and a free-standing electrode was formed as the solvent was evaporated. In this example, the cathode had 23.1 mg $LiFe_{0.9}Mg_{0.1}PO_4$ active material. Thus, the proportions are as follows on a percent weight basis: 80% active material; 8% Super P carbon; and 12% Kynar binder.

A graphite counter electrode was prepared for use with the aforesaid cathode. The graphite counter electrode served as the anode in the electrochemical cell. The anode had 10.8 mg of the MCMB graphite active material. The graphite electrode was fabricated by solvent casting a slurry of MCMB2528 graphite, binder, and casting solvent. MCMB2528 is a mesocarbon microbead material supplied by Alumina Trading, which is the U.S. distributor for the supplier, Osaka Gas Company of Japan. This material has a density of about 2.24 grams per cubic centimeter; a particle size maximum for at least 95% by weight of the particles of 37 microns; median size of about 22.5 microns and an interlayer distance of about 0.336. As in the case of the cathode, the binder was a copolymer of polyvinylidene difluoride (PVdF) and hexafluoropropylene (HFP) in a wt. ratio of PVdF to HFP of 88:12. This binder is sold under the designation of Kynar Flex 2801®, showing it's a registered trademark. Kynar Flex is available from Atochem Corporation. An electronic grade solvent was used. The slurry was cast onto glass and a free standing electrode was formed as the casting solvent evaporated. The electrode composition was approximately as follows on a dry weight basis: 85% graphite; 12% binder; and 3% conductive carbon.

A rocking chair battery was prepared comprising the anode, the cathode, and an electrolyte. The ratio of the active cathode mass to the active anode mass was about 2.14:1. The two electrode layers were arranged with an electrolyte layer in between, and the layers were laminated together using heat and pressure as per the Bell Comm. Res. patents incorporated herein by reference earlier. In a preferred method, the cell is activated with EC/DMC solvent in a weight ratio of 2:1 in a solution containing 1 M $LiPF_6$ salt.

Figure 19:
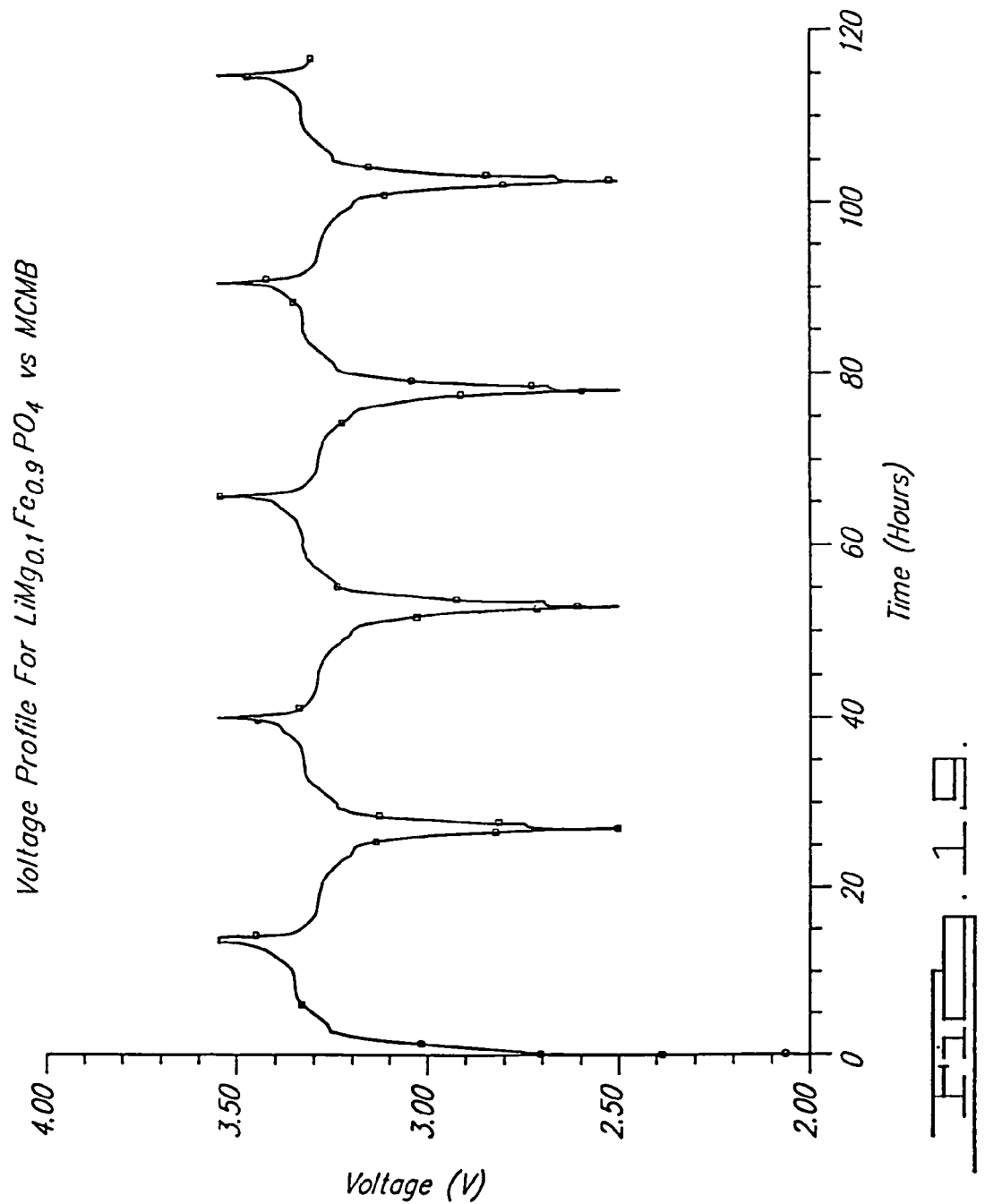
FIG. 19 is a graph of potential over time for the first four complete cycles of the $LiMg_{0.1}Fe_{0.9}PO_4$/MCMB graphite cell of the invention.
Figure 20:
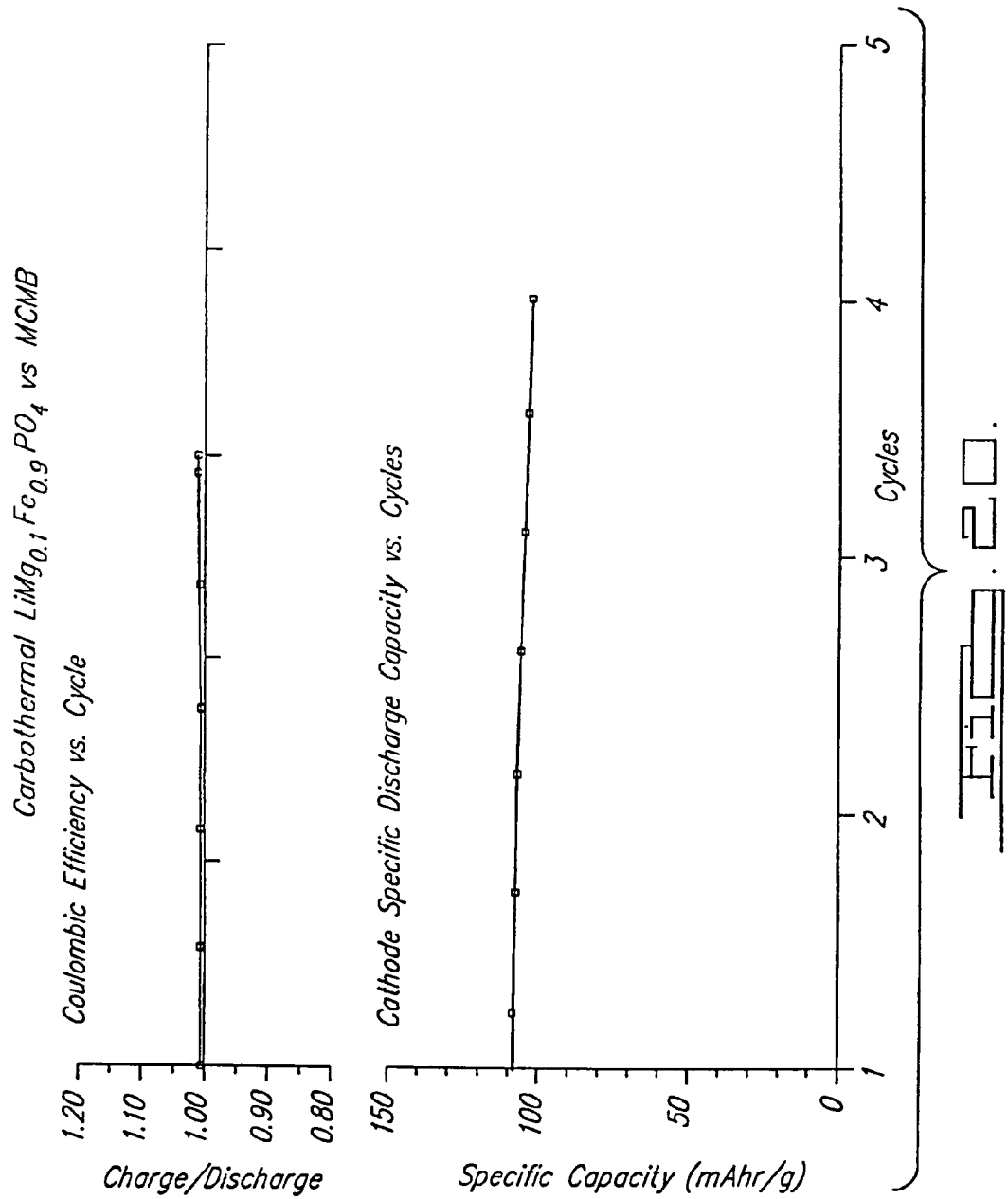
FIG. 20 is a two-part graph based on multiple constant current cycling of $LiFe_{0.9}Mg_{0.1}PO_4$ cycled with an MCMB graphite anode using the electrolyte as described in connection with FIG. 2 and cycled, charge and discharge at ±0.2 milliamps per square centimeter, 2.5 to 3.6 volts, 23° C. and based on a C/10 (10 hour) rate. In the two-part graph.

FIGS. 19 and 20 show data for the first four complete cycles of the lithium ion cell having the $LiFe_{0.9}Mg_{0.1}PO_4$ cathode and the MCMB2528 anode. The cell comprised 23.1 mg active $LiFe_{0.9}Mg_{0.1}P_4$ and 10.8 mg active MCMB2528 for a cathode to anode mass ratio of 2.14. The cell was charged and discharged at 23° C. at an approximate C/10 (10 hour) rate between voltage limits of 2.50 V and 3.60 V. The voltage profile plot (FIG. 19) shows the variation in cell voltage versus time for the $LiFe_{0.9}Mg_{0.1}PO_4$/MCMB2528 lithium ion cell. The symmetrical nature of the charge-discharge is clearly evident. The small degree of voltage hysteresis between the charge and discharge processes is evidence for the low overvoltage in the system, which is very good. FIG. 20 shows the variation of $LiFe_{0.9}Mg_{0.1}PO_4$ specific capacity with cycle number. Clearly, over the cycles shown, the material demonstrates good cycling stability.

Figure 21:
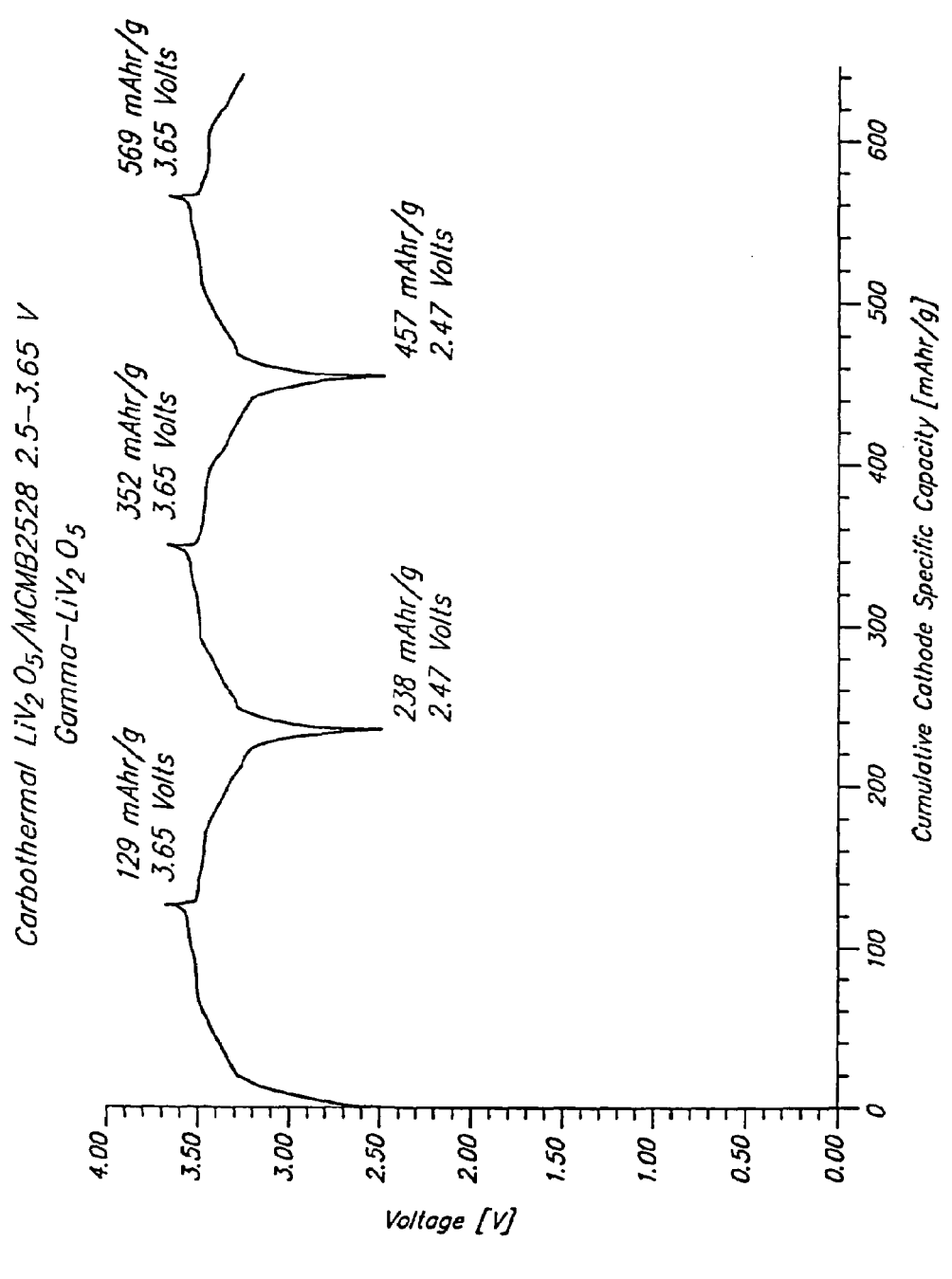
FIG. 21 is a graph of potential over time for the first three complete cycles of the gamma-$LiV_2O_5$/MCMB graphite cell of the invention.

FIG. 21 shows data for the first three complete cycles of the lithium ion cell having the gamma-$LiV_2O_5$ cathode and the MCMB2528 anode. The cell prepared was a rocking chair, lithium ion cell as described above. The cell comprised 29.1 mg gamma-$LiV_2O_5$ cathode active material and 12.2 mg MCMB2528 anode active material, for a cathode to anode mass ratio of 2.39. As stated earlier, the liquid electrolyte used was EC/DMC (2:1) and 1M $LiPF_6$. The cell was charged and discharged at 23° C. at an approximate C/10 (10 hour) rate between voltage limits of 2.50 V and 3.65 V. The voltage profile plot (FIG. 21) shows the variation in cell voltage versus time for the $LiV_2O_5$/MCMB2528 lithium ion cell. The symmetrical nature of the charge-discharge is clearly evident. The small degree of voltage hysteresis between the charge and discharge processes is evidence for the low overvoltage in the system, which is very good.

In summary, the invention provides new compounds $Li_aMI_bMII_c(PO_4)_d$ and gamma-$LiV_2O_5$ by new methods which are adaptable to commercial scale production. The $Li_1MI_{1-y}MII_yPO_4$ compounds are isostructural olivine compounds as demonstrated by XRD analysis. Substituted compounds, such as $LiFe_{1-y}Mg_yPO_4$ show better performance than $LiFePO_4$ unsubstituted compounds when used as electrode active materials. The method of the invention utilizes the reducing capabilities of carbon along with selected precursors and reaction conditions to produce high quality products suitable as electrode active materials or as ion conductors. The reduction capability of carbon over a broad temperature range is selectively applied along with thermodynamic and kinetic considerations to provide an energy-efficient, economical and convenient process to produce compounds of a desired composition and structure. This is in contrast to known methods.

Principles of carbothermal reduction have been applied to produce pure metal from metal oxides by removal of oxygen. See, for example, U.S. Pat. Nos. 2,580,878, 2,570,232, 4,177,060, and 5,803,974. Principles of carbothermal and thermal reduction have also been used to form carbides. See, for example, U.S. Pat. Nos. 3,865,745 and 5,384,291; and non-oxide ceramics (see U.S. Pat. No. 5,607,297). Such methods are not known to have been applied to form lithiated products or to form products without oxygen abstraction from the precursor. The methods described with respect to the present invention provide high quality products which are prepared from precursors which are lithiated during the reaction without oxygen abstraction. This is a surprising result. The new methods of the invention also provide new compounds not known to have been made before.

For example, alpha-$V_2O_5$ is conventionally lithiated electrochemically against metallic lithium. Thus, alpha-$V_2O_5$ is not suitable as a source of lithium for a cell. As a result, alpha-$V_2O_5$ is not used in an ion cell. In the present invention, alpha-$V_2O_5$ is lithiated by carbothermal reduction using a simple lithium-containing compound and the reducing capability of carbon to form a gamma-$LiV_2O_5$. The single phase compound, gamma-$LiV_2O_5$ is not known to have been directly and independently prepared before. There is not known to be a direct synthesis route. Attempts to form it as a single phase resulted in a mixed phase product containing one or more beta phases and having the formula $Li_xV_2O_5$ with $0<x\leq 0.49$. This is far different from the present single phase gamma-$Li_xV_2O_5$ with x equal to one, or very close to one. The flexibility of the process of the present invention is such that it can be conducted over a wide temperature range. The higher the temperature, the more quickly the reaction proceeds. For example, at 650° C., conversion of alpha-$V_2O_5$ to gamma-$LiV_2O_5$ occurs in about one hour, and at 500° it takes about 8 hours. Here, about one quarter (¼) atomic unit of carbon is used to reduce one atomic unit of vanadium, that is, $V^{+5}V^{+5}$ to $V^{+5}V^{+4}$. The predominate reaction is C to $CO_2$ where for each atomic unit of carbon at ground state zero, a plus 4 oxidation state results. Correspondingly, for each ¼ atomic unit of carbon, one atomic unit of vanadium is reduced from $V^{+5}$ to $V^{+4}$. (See Reaction 5). The new product, gamma-$LiV_2O_5$ is air-stable and suitable as an electrode material for an ion cell or rocking chair battery.

The convenience and energy efficiency of the present process can also be contrasted to known methods for forming products under reducing atmosphere such as $H_2$ which is difficult to control, and from complex and expensive precursors. In the present invention, carbon is the reducing agent, and simple, inexpensive and even naturally occurring precursors are useable. For example, it is possible to produce $LiFePO_4$ from $Fe_2O_3$, a simple common oxide. (See Reaction 1b). The production of $LiFePO_4$ provides a good example of the thermodynamic and kinetic features of the method. Iron phosphate is reduced by carbon and lithiated over a broad temperature range. At about 600° C., the C to $CO_2$ reaction predominates and takes about a week to complete. At about 750° C., the C to CO reaction predominates and takes about 8 hours to complete. The C to $CO_2$ reaction requires less carbon reductant but takes longer due to the low temperature kinetics. The C to CO reaction requires about twice as much carbon, but due to the high temperature reaction kinetics, it proceeds relatively fast. In both cases, the Fe in the precursor $Fe_2O_3$ has oxidation state +3 and is reduced to oxidation (valence) state +2 in the product $LiFePO_4$. The C to CO reaction requires that ½ atomic unit of carbon be used for each atomic unit of Fe reduced by one valence state. The CO to $CO_2$ reaction requires that ¼ atomic unit of carbon be used for each atomic unit of Fe reduced by one valence state.

The active materials of the invention are also characterized by being stable in an as-prepared condition, in the presence of air and particularly humid air. This is a striking advantage, because it facilitates preparation of and assembly of battery cathodes and cells, without the requirement for controlled atmosphere. This feature is particularly important, as those skilled in the art will recognize that air stability, that is, lack of degradation on exposure to air, is very important for commercial processing. Air-stability is known in the art to more specifically indicate that a material does not hydrolyze in presence of moist air. Generally, air-stable materials are also characterized by Li being extracted therefrom above about 3.0 volts versus lithium. The higher the extraction potential, the more tightly bound the lithium ions are to the host lattice. This tightly bound property generally confers air stability on the material. The air-stability of the materials of the invention is consistent with the stability demonstrated by cycling at the conditions stated herein. This is in contrast to materials which insert Li at lower voltages, below about 3.0 volts versus lithium, and which are not air-stable, and which hydrolyze in moist air.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A compound represented by the nominal formula $LiFe_{1-y}Mg_yPO_4$, wherein $0<y<1$.

2. The compound of claim 1, wherein $0<y<0.5$.

3. The compound of claim 2, wherein $0<y\leq 0.2$.

4. The compound of claim 3, wherein $0<y\leq 0.1$.

5. The compound of claim 1, wherein the compound has an olivine structure.

6. The compound of claim 1, wherein the compound is a single phase compound.

7. The compound of claim 1, wherein $y=0.2$.

8. The compound of claim 1, wherein $y=0.1$.

9. An electrode, comprising an active material represented by the nominal formula $LiFe_{1-y}Mg_yPO_4$, wherein $0<y<1$.

10. The electrode of claim 9, wherein $0<y<0.5$.

11. The electrode of claim 10, wherein $0<y<0.2$.

12. The electrode of claim 11, wherein $0<y\leq 0.1$.

13. The electrode of claim 9, wherein the active material has an olivine structure.

14. The electrode of claim 9, wherein the active material is a single phase compound.

15. The electrode of claim 9, wherein $y=0.2$.

16. The electrode of claim 9, wherein $y=0.1$.

17. The electrode of claim 9, further comprising an electrically conductive diluent, and a binder.

18. The electrode of claim 17, wherein the electrically conductive diluent is carbon.

19. The electrode of claim 18, wherein the electrically conductive diluent is carbon black.

20. The electrode of claim 19, wherein the electrode comprises from 5 to 30% by weight carbon black.

21. The electrode of claim 17, wherein the binder is a copolymer of polyvinylidene difluoride (PVdF) and hexafluoropropylene (HFP).

22. The electrode of claim 17, wherein the electrode comprises from 3 to 20% by weight binder.

23. A battery, comprising:
   a first electrode comprising an active material represented by the nominal formula $LiFe_{1-y}Mg_yPO_4$, wherein $0<y<1$;
   a second electrode which is a counter-electrode to the first electrode; and
   an electrolyte.

24. The battery of claim 23, wherein $0<y<0.5$.

25. The battery of claim 24, wherein $0<y\leq0.2$.

26. The battery of claim 25, wherein $0<y\leq0.1$.

27. The battery of claim 23, wherein the active material has an olivine structure.

28. The battery of claim 23, wherein the active material is a single phase compound.

29. The battery of claim 23, wherein $y=0.2$.

30. The battery of claim 23, wherein $y=0.1$.

31. The battery of claim 23, wherein the first electrode further comprises an electrically conductive diluent, and a binder.

32. The battery of claim 31, wherein the electrically conductive diluent is carbon.

33. The battery of claim 32, wherein the electrically conductive diluent is carbon black.

34. The battery of claim 33, wherein the first electrode comprises from 5 to 30% by weight carbon black.

35. The battery of claim 31, wherein the binder is a copolymer of polyvinylidene difluoride (PVdF) and hexafluoropropylene (HFP).

36. The battery of claim 31, wherein the first electrode comprises from 3 to 20% by weight binder.

37. The battery of claim 23, wherein the second electrode comprises an insertion active material.

38. The battery of claim 37, wherein the insertion active material is selected from the group consisting of a metal oxide, metal chalcogenide, carbon, graphite, and mixtures thereof.

39. The battery of claim 37, wherein the insertion active material is graphite.

40. The battery of claim 37, wherein the first and second electrodes each further comprise an electrically conductive diluent, and a binder.

41. The battery of claim 40, wherein the electrically conductive diluent is carbon.

42. The battery of claim 41, wherein the electrically conductive diluent is carbon black.

43. The battery of claim 42, wherein the first and second electrode each comprise from 5 to 30% by weight carbon black.

44. The battery of claim 40, wherein the binder is a copolymer of polyvinylidene difluoride (PVdF) and hexafluoropropylene (HFP).

45. The battery of claim 40, wherein the first and second electrode each comprise from 3 to 20% by weight binder.

46. The battery of claim 23, wherein the electrolyte comprises a lithium salt and a solvent selected from the group consisting of dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, and mixtures thereof.

* * * * *